(12) United States Patent
Kwon et al.

(10) Patent No.: US 11,005,694 B2
(45) Date of Patent: May 11, 2021

(54) APPARATUS FOR ANALYZING TRANSMITTER IDENTIFICATION SIGNAL AND METHOD USING THE SAME

(71) Applicant: ELECTRONICS AND TELECOMMUNICATIONS RESEARCH INSTITUTE, Daejeon (KR)

(72) Inventors: Sun-Hyoung Kwon, Daejeon (KR); Sung-Ik Park, Daejeon (KR); Jae-Young Lee, Daejeon (KR); Bo-Mi Lim, Daejeon (KR); Heung-Mook Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 87 days.

(21) Appl. No.: 16/357,735

(22) Filed: Mar. 19, 2019

(65) Prior Publication Data

US 2019/0296951 A1 Sep. 26, 2019

(30) Foreign Application Priority Data

Mar. 22, 2018 (KR) .................. 10-2018-0033526
Mar. 8, 2019 (KR) .................. 10-2019-0027153

(51) Int. Cl.
*H04L 27/26* (2006.01)
*H04L 25/06* (2006.01)
*H04L 5/00* (2006.01)

(52) U.S. Cl.
CPC ........ *H04L 27/2613* (2013.01); *H04L 25/061* (2013.01); *H04L 27/2607* (2013.01);
(Continued)

(58) Field of Classification Search
CPC .............. H04L 25/0212; H04L 25/022; H04L 25/0228; H04L 25/061; H04L 27/2607;
(Continued)

(56) References Cited

U.S. PATENT DOCUMENTS

2003/0031121 A1* 2/2003 Sudo .................... H04L 1/0006
370/203
2005/0117070 A1* 6/2005 Wu ........................ H04H 20/72
348/725

(Continued)

OTHER PUBLICATIONS

Park, Sung Ik et al., "Transmitter Identification Signal Analyzer for Single Frequency Network", *IEEE Transactions on Broadcasting*, vol. 54, No. 3, Sep. 2008 (pp. 383-393).

*Primary Examiner* — Asad M Nawaz
*Assistant Examiner* — Zhaohui Yang
(74) *Attorney, Agent, or Firm* — NSIP Law

(57) ABSTRACT

Disclosed herein are an apparatus for analyzing a transmitter identification (TxID) signal and a method using the apparatus. The apparatus for analyzing the TxID signal includes a demodulator for decoding the bootstrap of a received signal; a cancellation unit for performing a host signal cancellation process for the received signal, thereby generating a host-signal-cancelled received signal; a correlator for calculating a correlation value between a signal corresponding to the host-signal-cancelled received signal and a signal corresponding to a TxID sequence; and a TxID profile analyzer for generating information about a channel between a transmitter corresponding to the TxID signal and a receiver using the correlation value.

20 Claims, 15 Drawing Sheets

(52) U.S. Cl.
CPC ...... *H04L 27/2627* (2013.01); *H04L 27/2649* (2013.01); *H04L 5/0007* (2013.01)

(58) Field of Classification Search
CPC ............. H04L 27/2613; H04L 27/2627; H04L 27/2647; H04L 27/2649; H04L 5/0007
See application file for complete search history.

(56) References Cited

U.S. PATENT DOCUMENTS

2010/0254498 A1* 10/2010 Park ....................... H04H 60/37
 375/349
2020/0076454 A1* 3/2020 Oh .......................... H04L 25/02

* cited by examiner

APPARATUS FOR ANALYZING TRANSMITTER IDENTIFICATION SIGNAL AND METHOD USING THE SAME

CROSS REFERENCE TO RELATED APPLICATIONS

This application claims the benefit of Korean Patent Application No. 10-2018-0033526, filed Mar. 22, 2018, and No. 10-2019-0027153, filed Mar. 8, 2019, which are hereby incorporated by reference in their entirety into this application.

BACKGROUND OF THE INVENTION

1. Technical Field

The present invention relates generally to technology for transmitting and receiving transmitter identification signals in a broadcast system, and more particularly to a system for transmitting and receiving transmitter identification signals that are suitable for a next-generation broadcast communication system.

2. Description of the Related Art

Because the first-generation digital terrestrial TV broadcasting causes co-channel interference over an area, the radius of which is three times the radius of the service coverage area from the center thereof, it is impossible to reuse the same frequency within the corresponding area.

As described above, the area in which the same frequency cannot be reused is called 'white space', and the presence of 'white space' significantly decreases spectral efficiency.

In order to improve spectral efficiency, it is required to develop a transmission technique that not only increases transmission capacity but also ensures reception robustness. Recently, the ATSC 3.0 physical layer standard (A/322), which facilitates frequency reuse, eliminates white space, and facilitates the construction and management of a single-frequency network (SFN), has been established.

The ATSC 3.0 physical layer standard defines a transmitter identification (TxID) technique for identifying each transmitter in an SFN. Using the TxID technique, signals from respective transmitters may be identified in an SFN, whereby detailed information about a channel profile for constructing an optimal SFN may be acquired.

SUMMARY OF THE INVENTION

An object of the present invention is to enable a receiver to identify transmitters in a next-generation broadcast system by using transmitter identification (TxID) signals transmitted by the transmitters.

Another object of the present invention is to provide a transmitter identification (TxID) signal reception method that is suitable for next-generation standards such as ATSC 3.0 and the like.

A further object of the present invention is to efficiently detect a transmitter identification (TxID) signal injected into a host broadcasting signal, such as a host ATSC 3.0 signal or the like, and to precisely analyze the detected TxID signal, thereby acquiring accurate network configuration information.

In order to accomplish the above objects, an apparatus for analyzing a transmitter identification (TxID) signal according to the present invention includes a demodulator for decoding the bootstrap of a received signal; a cancellation unit for performing a host signal cancellation process for the received signal, thereby generating a host-signal-cancelled received signal; a correlator for calculating a correlation value between a signal corresponding to the host-signal-cancelled received signal and a signal corresponding to a TxID sequence; and a TxID profile analyzer for generating information about a channel between a transmitter corresponding to the TxID signal and a receiver using the correlation value.

Here, the apparatus may further include an ensemble averaging unit for averaging frame signals corresponding to the host-signal-cancelled received signal.

Here, the host signal cancellation process may be configured to cancel a cancellation signal, corresponding to a preamble pilot included in a host broadcasting signal, from the received signal.

Here, the host signal cancellation process may be configured to cancel a cancellation signal, corresponding to an entire host broadcasting signal, from the received signal.

Here, the cancellation signal may be generated using at least a portion of a preamble, which is reconstructed through preamble decoding including channel decoding, and a preamble pilot, which is regenerated using the bootstrap.

Here, the cancellation signal may be generated using a hard-decision signal, which is generated through modulation of bits reconstructed through hard-decision decoding, and a preamble pilot, which is regenerated using the bootstrap.

Here, the modulation may be Quadrature Phase-Shift Keying (QPSK).

Here, averaging may be performed using the correlation value, and the signal corresponding to the host-signal-cancelled received signal may be the host-signal-cancelled received signal.

Here, averaging may be performed using the host-signal-cancelled received signal, and the signal corresponding to the host-signal-cancelled received signal may be a signal generated through averaging.

Here, the preamble pilot may be generated using a preamble_structure field included in the bootstrap.

Also, a method for analyzing a transmitter identification (TxID) signal according to an embodiment of the present invention includes decoding the bootstrap of a received signal; performing a host signal cancellation process for the received signal, thereby generating a host-signal-cancelled received signal; calculating a correlation value between a signal corresponding to the host-signal-cancelled received signal and a signal corresponding to a TxID sequence; and generating information about a channel between a transmitter corresponding to the TxID signal and a receiver using the correlation value.

Here, the method may further include averaging frame signals corresponding to the host-signal-cancelled received signal.

Here, the host signal cancellation process may be configured to cancel a cancellation signal, corresponding to a preamble pilot included in a host broadcasting signal, from the received signal.

Here, the host signal cancellation process may be configured to cancel a cancellation signal, corresponding to an entire host broadcasting signal, from the received signal.

Here, the cancellation signal may be generated using at least a portion of a preamble, which is reconstructed through preamble decoding including channel decoding, and a preamble pilot, which is regenerated using the bootstrap.

Here, the cancellation signal may be generated using a hard-decision signal, which is generated through modulation of bits reconstructed through hard-decision decoding, and a preamble pilot, which is regenerated using the bootstrap.

Here, the modulation may be Quadrature Phase-Shift Keying (QPSK).

Here, averaging may be performed using the correlation value, and the signal corresponding to the host-signal-cancelled received signal may be the host-signal-cancelled received signal.

Here, averaging may be performed using the host-signal-cancelled received signal, and the signal corresponding to the host-signal-cancelled received signal may be a signal generated through averaging.

Here, the preamble pilot may be generated using a preamble_structure field included in the bootstrap.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
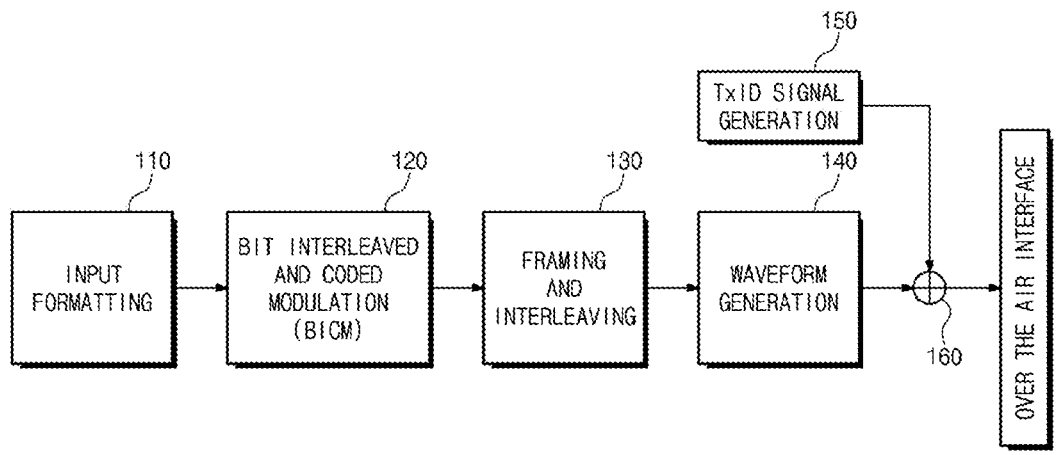
FIG. 1 is a block diagram that shows an example of an apparatus for transmitting a broadcasting signal using a transmitter identification signal according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

The present invention may be variously changed and may have various embodiments, and specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. The terms identical to those defined in generally used dictionaries should be interpreted as having meanings identical to contextual meanings of the related art, and are not to be interpreted as having ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

The transmitter identification (TxID) allows unique identification of each individual transmitter.

Identification is achieved via an RF watermark, which enables system monitoring and measurements, interference source determination, geolocation, and other applications. One of the specific uses of the TxID signal is to allow channel impulse response components of each transmitter to be measured independently in order to support in-service system adjustments, including the power levels and delay offsets of individual transmitters. Such channel impulse response information may be measured using special monitoring instruments but does not need to be processed by a general broadcast communication receiver such as an ATSC 3.0 receiver. That is, the TxID signal may appear to such receivers as a small amount of noise in the broadcast communication waveform.

FIG. 1 is a block diagram showing an example of an apparatus for transmitting a broadcasting signal using a transmitter identification signal according to an embodiment of the present invention.

Referring to FIG. 1, an apparatus for transmitting a broadcasting signal using a transmitter identification signal according to an embodiment of the present invention includes an input-formatting unit 110, a BICM unit 120, a frame builder 130, a waveform generator 140, a transmitter identification signal generator 150 and a combiner 160.

The input-formatting unit 110, the BICM unit 120, the frame builder 130 and the waveform generator 140 shown in FIG. 1 may be components of a general apparatus for transmitting a broadcasting signal. That is, the apparatus for transmitting a broadcasting signal which transmits the transmitter identification signal may be configured by adding the transmitter identification signal generator 150 and the combiner 160 to the components of the general apparatus for transmitting a broadcasting signal.

The input-formatting unit 110 performs at least one of encapsulation of data, compression of data, baseband formatting and scheduling. That is, the input-formatting unit 110 receives data packets and generates output packets in accordance with a predetermined protocol. In this case, the baseband formatting may include baseband packet construction, baseband packet header addition and baseband packet scrambling.

The BICM unit 120 may perform BICM encoding. Generally, a BICM (Bit-Interleaved Coded Modulation) device includes an error correction encoder, a bit interleaver, and a symbol mapper, so the BICM unit 120 may include the error correction encoder, the bit interleaver and the symbol mapper. In particular, each of the error correction encoders (the core-layer FEC encoder and the enhanced-layer FEC encoder) may be formed by connecting a BCH encoder and an LDPC encoder in series. In this case, the input of the error correction encoder is input to the BCH encoder, the output of the BCH encoder is input to the LDPC encoder, and the output of the LDPC encoder may be the output of the error correction encoder.

The frame builder 130 may generate the broadcasting signal frame. In this case, the frame builder 130 can perform at least one of time interleaving and frequency interleaving.

The waveform generator 140 generates a host broadcasting signal such as an ATSC 3.0 signal. In this case, the waveform generator 140 may perform at least one of pilot insertion, MISO predistortion, an IFFT, PAPR (Peak-to-Average-Power-Reduction), guard interval insertion and bootstrap prefixing.

The transmitter identification signal generator 150 generates a transmitter identification signal for identifying a transmitter. In this case, the transmitter identification signal generator 150 may be scaled using an injection-level code.

In this case, the injection-level code may consist of 4 bits and may be assigned for injection-level values set with 3 dB intervals.

In this case, the injection-level values may cover a range from 9.0 dB to 45.0 dB and may include a value corresponding to the case in which the transmitter identification signal is not emitted.

In this case, the injection-level code may be set to "0000" for the case in which the transmitter identification signal is not emitted.

In this case, the injection-level code may be assigned for an injection-level value corresponding to a second level prior to an injection-level value corresponding to a first level, the second level may be larger than the first level, and the first level and the second level may correspond to a power reduction of the transmitter identification signal relative to the host broadcasting signal.

The combiner 160 injects the transmitter identification signal into the host broadcasting signal in the time domain so that the transmitter identification signal is transmitted synchronously with the host broadcasting signal.

Accordingly, the apparatus for transmitting the broadcasting signal shown in FIG. 1 transmits the signal including a TxID which identifies the transmitter over-the-air (OTA). In this case, the transmitter identification signal may be a DSBSS (Direct Sequence Buried Spread Spectrum) RF watermark signal carrying a unique Gold code sequence.

Each transmitter identification signal (TxID signal) is injected into the host broadcasting signal in the time domain and is transmitted synchronously with the host broadcasting signal.

The transmitter identification signal carries a Gold code sequence that is unique to each transmitter on a given RF channel within the largest possible geographic region and is transmitted only within the first preamble symbol period.

The TxID signal may be a signal generated based on the Gold code sequence, and may be assigned uniquely to each transmitter.

Figure 2:
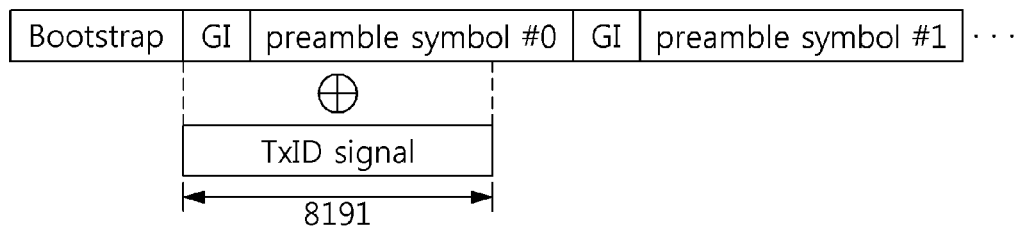
FIGS. 2 to 4 are diagrams that show examples of the transmitter identification signal injected in the first preamble symbol period.
Figure 3:
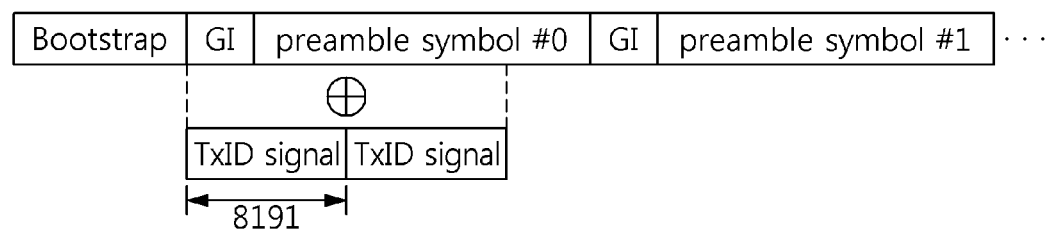
Figure 4:
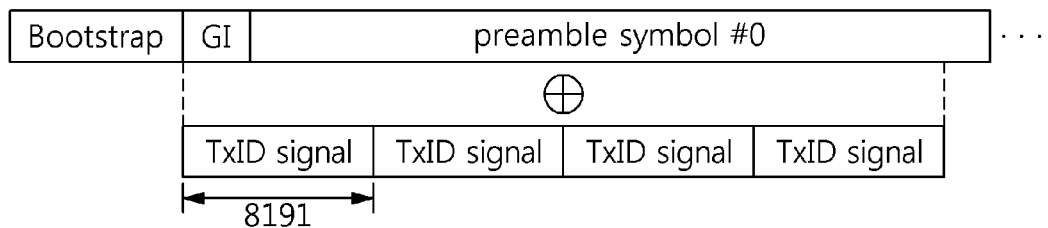

FIGS. 2 to 4 are diagrams showing examples of the transmitter identification signal injected in the first preamble symbol period.

The transmitter identification signal is added at a reduced level relative to the emissions from the particular transmitter in FIGS. 2 to 4.

In this case, the transmitter identification signal may be transmitted within the first preamble symbol period including a guard interval after a bootstrap of the host broadcasting signal. In this case, the detection performance of the bootstrap is not degraded since the transmitter identification signal is not added to the bootstrap.

The signal corresponding to the first bit of the transmitter identification (sequence or pattern) may be emitted simultaneously with the first sample of the first preamble symbol including that symbol's guard interval, and the second bit of the transmitter identification signal may be emitted simultaneously with the second sample of the first preamble symbol including that symbol's guard interval. In this case, the bits of the transmitter identification signal may be modulated.

Referring to FIG. 2, a transmitter identification sequence that has a length of 8191 bits may be emitted once per frame when an 8K FFT preamble symbol is used.

Referring to FIG. 3, a transmitter identification sequence having a length of 8191 bits may be repeated twice within the first preamble symbol period when a 16K FFT preamble symbol is used, so that a sequence having a total length of 16382 bits may be emitted.

In this case, the second transmitter identification sequence may have polarity opposite that of the first transmitter identification sequence in order to cancel out DC components.

Referring to FIG. 4, a transmitter identification sequence having a length of 8191 bits may be repeated four times within the first preamble symbol period when a 32K FFT preamble symbol is used, so that a sequence having a total length of 32764 bits may be emitted.

In this case, the second and the fourth transmitter identification sequences may have polarities opposite polarity of the first transmitter identification sequence, while the third transmitter identification sequence may have the same polarity as the first transmitter identification sequence.

That is, when the transmitter identification sequence is repeated, the even-numbered sequence may have polarity opposite that of the odd-numbered sequence.

In this case, the FFT size may be indicated by the preamble_structure of the bootstrap.

This is, the TxID may be repeatedly inserted for a long FFT size in order to maximize the amount of the TxID signal in the first preamble because the lengths of the preamble symbols are different according to the FFT sizes.

Figure 5:
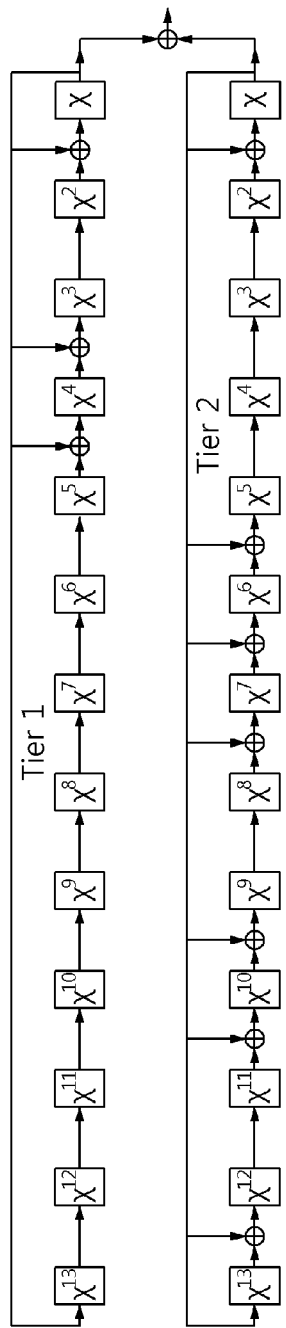
FIG. 5 is a block diagram that shows an example of the TxID code generator for generating the transmitter identification signal according to an embodiment of the present invention.

FIG. 5 is a block diagram showing an example of the TxID code generator for generating the transmitter identification signal according to an embodiment of the present invention.

Referring to FIG. 5, it can be seen that the TxID code generator for generating the transmitter identification signal according to an embodiment of the present invention generates the code sequence using a pair of shift register units that have specified feedback arrangements and are set to known values at specified times. That is, the TxID code generator shown in FIG. 5 may be a Gold sequence generator. In this case, the Gold sequence may be a kind of PN (Pseudorandom Noise) sequence.

The two shift register units (Tier 1, Tier 2) used for generating the transmitter identification sequence transmitted by the transmitter identification signal may be preloaded during a specified setup interval. The combined output of the two shift register units may be sent to the BPSK modulator for subsequent injection into and transmission with the host broadcasting signal.

As shown in FIG. 5, the two shift register units may be defined by the following generator polynomials:

Tier 1 generator polynomial: $x^{13}+x^4+x^3+x+1$
Tier 2 generator polynomial: $x^{13}+x^{12}+x^{10}+x^9+x^7+x^6+x^5+x+1$ Each of the two shift register units shall be preloaded prior to the generation of the transmitter identification sequence for each frame.

In this case, the registers of the Tier 1 register unit may be preloaded with a value of 1 in the x stage and 0 in all other stages.

In this case, the registers of the Tier 2 register unit may be preloaded by a 13-bit value txid_address corresponding to the transmitter. That is, the 13-bit txid_address may be preloaded into the $x^{13}$ through the $x^1$ stages of the tier 2 shift register unit. In this case, the msb of the txid_address may correspond to the $x^{13}$ register of the tier 2 register unit, and the lsb of the txid_address may correspond to the x register of the tier 2 register unit.

The txid_address value may be uniquely assigned to each transmitter on a given RF channel, and may be used by the scheduler for controlling each individual transmitter.

Table 1 below is a table showing the preloading values of the registers of the TxID code generator shown in FIG. 5.

TABLE 1

| | Tier 1 | Tier 2 |
|---|---|---|
| $x^{13}$ | 0 | $t^{13}$ |
| $x^{12}$ | 0 | $t^{12}$ |
| $x^{11}$ | 0 | $t^{11}$ |
| $x^{10}$ | 0 | $t^{10}$ |

TABLE 1-continued

| | Tier 1 | Tier 2 |
|---|---|---|
| $x^9$ | 0 | $t^9$ |
| $x^8$ | 0 | $t^8$ |
| $x^7$ | 0 | $t^7$ |
| $x^6$ | 0 | $t^6$ |
| $x^5$ | 0 | $t^5$ |
| $x^4$ | 0 | $t^4$ |
| $x^3$ | 0 | $t^3$ |
| $x^2$ | 0 | $t^2$ |
| $x^1$ | 1 | $t^1$ |

In Table 1, values denoted as t correspond to the respective bits of the txid_address field, with $t^{13}$ representing the msb and $t^1$ representing the lsb.

According to Table 1, the transmitter identification sequence (TxID sequence) has a length of $2^{13}-1=8191$ bits, and the total number of sequences that can be assigned to individual transmitters is $2^{13}=8192$.

The generated Gold code sequence may be BPSK-modulated before injection into the host broadcasting signal symbol (ATSC 3.0 preamble). If the generated sequence bit is '0', it may be modulated as '−1', and if the generated sequence bit is '1', it may be modulated as '+1'. The BPSK-modulated transmitter identification signal (TxID signal) may be injected into the in-phase part of the host broadcasting signal preamble and may not be injected into the quadrature part because the sequence is modulated by the BPSK modulation.

In order to minimize the performance degradation of the preamble while maintaining the detection performance of the transmitter identification signal, a wide range of injection levels may be used to inject the transmitter identification signal into the host broadcasting signal preamble.

The injection level of the transmitter identification signal may include turning off emission of the transmitter identification signal and may be provided from the controlling scheduler to the transmitter.

In this case, the injection levels of the transmitter identification signal may be defined as dB values.

Table 2 below is a table showing injection-level codes according to an embodiment of the present invention.

The transmitter identification signal scaled as shown in Table 2 below may be injected into the broadcasting signal preamble immediately following the bootstrap.

TABLE 2

| TxID Injection-Level Code | TxID Injection Level Below Preamble (dB) | Scaling Factor (Amplitude) |
|---|---|---|
| 0000 | OFF | 0 |
| 0001 | 45.0 dB | 0.0056234 |
| 0010 | 42.0 dB | 0.0079433 |
| 0011 | 39.0 dB | 0.0112202 |
| 0100 | 36.0 dB | 0.0158489 |
| 0101 | 33.0 dB | 0.0223872 |
| 0110 | 30.0 dB | 0.0316228 |
| 0111 | 27.0 dB | 0.0446684 |
| 1000 | 24.0 dB | 0.0630957 |
| 1001 | 21.0 dB | 0.0891251 |
| 1010 | 18.0 dB | 0.1258925 |
| 1011 | 15.0 dB | 0.1778279 |
| 1100 | 12.0 dB | 0.2511886 |
| 1101 | 9.0 dB | 0.3548134 |
| 1110 | Reserved | — |
| 1111 | Reserved | — |

As shown in the Table 2, the injection-level code may consist of 4 bits and may be assigned for injection-level values set with 3 dB intervals.

In this case, the injection-level values may cover a range from 9.0 dB to 45.0 dB and may include a value corresponding to the case in which the transmitter identification signal is not emitted (OFF).

In this case, the injection-level code may be set to "0000" for the case in which the transmitter identification signal is not emitted.

In this case, the injection-level code may be assigned for an injection-level value corresponding to a second level prior to an injection-level value corresponding to a first level, the second level may be larger than the first level, and the first level and the second level may correspond to a power reduction of the transmitter identification signal relative to the host broadcasting signal. For example, an injection-level code corresponding to 45.0 dB may be preferentially assigned, rather than an injection-level code corresponding to 42.0 dB.

The performance with which a TxID signal (a transmitter identification signal) is detected is significantly affected by the injection level of the TxID signal, a noise level, a reception strength, and the like. The injection level of the TxID signal needs to be appropriately selected within a range in which the TxID signal does not affect a host broadcasting signal. In particular, because there is no normalization process after a TxID signal is injected, the injection of a high-level TxID signal results in an increase in transmission power. The transmission power of a transmitter is strictly limited, and generally, the actual transmission power should not exceed 1.05 times the permitted transmission power. Accordingly, it is desirable for the TxID injection level to fall within a range from 15 dB to 45 dB. Also, injection of a high-level TxID signal may degrade the performance of a preamble corresponding to a host broadcasting signal. Therefore, it is desirable to inject a TxID signal, the level of which is adequate to detect the TxID signal but is sufficiently low such that the effect thereof on the host broadcasting signal is negligible.

Accordingly, because the strength of the TxID signal injected into the host broadcasting signal is not sufficiently large, it may be difficult for a receiver to detect the TxID signal.

Figure 6:
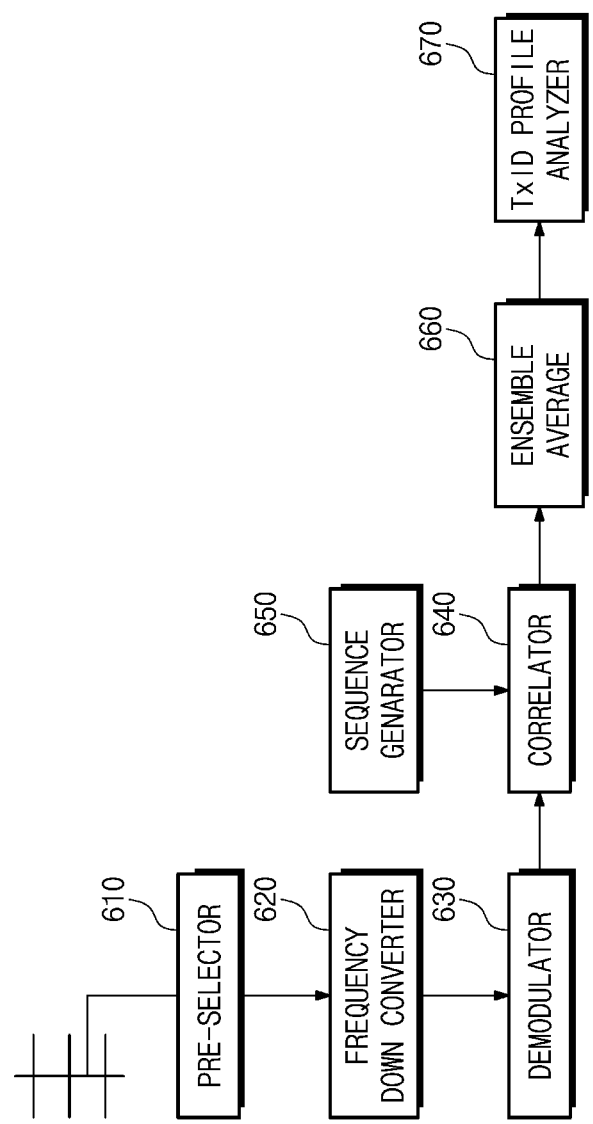
FIG. 6 is a block diagram that shows an example of an apparatus for analyzing a transmitter identification signal according to an embodiment of the present invention.

FIG. 6 is a block diagram that shows an example of an apparatus for analyzing a transmitter identification signal according to an embodiment of the present invention.

Referring to FIG. 6, the apparatus for analyzing a transmitter identification signal according to an embodiment of the present invention includes a pre-selector 610, a frequency downconverter 620, a demodulator 630, a correlator 640, a sequence generator 650, an ensemble averaging unit 660, and a TxID profile analyzer 670.

The pre-selector 610 saves only the signal of a selected channel and cancels the signals of neighboring channels when an ATSC 3.0 RF broadcasting signal, including TxID signals transmitted from multiple transmitters, is received by a reception antenna.

The frequency downconverter 620 performs frequency down-conversion for the input Radio Frequency (RF) signal, thereby generating an Intermediate Frequency (IF) signal.

The demodulator 630 receives the IF signal, reconstructs at least one of a bootstrap and a preamble, and performs time and frequency synchronization with the ATSC 3.0 broadcasting signal using the reconstructed bootstrap.

The sequence generator 650 generates a TxID sequence corresponding to the target to be analyzed in the transmitter identification signal.

The correlator 640 calculates a correlation value between the signal received by the receiver and the signal corresponding to the TxID sequence generated by the sequence generator 650.

The ensemble averaging unit 660 performs frame averaging (or ensemble averaging) on the correlation values for multiple frames, thereby improving TxID detection performance.

In the embodiment shown in FIG. 6, the ensemble averaging unit 660 has been described as operating by receiving the output of the correlator 640. However, the ensemble averaging unit 660 may operate by receiving the output of the demodulator 630, and the correlator 640 may operate by receiving the output of the ensemble averaging unit 660. In this case, the output of the correlator 640 may be provided directly to the TxID profile analyzer 670.

That is, the ensemble averaging unit 660 may average the correlation values for multiple frame signals, but may alternatively average the multiple frame signals first and then generate the correlation value using the averaged value.

Here, the operation of the ensemble averaging unit 660 may be intended to reduce noise components. That is, when multiple frames are collected and averaged, the strength of a desired signal (TxID signal) may be maintained, and the noise level may decreased, whereby the TxID detection performance may be improved.

The TxID profile analyzer 670 may acquire information about a channel between a desired transmitter and the receiver using the correlation value.

When frame averaging (or ensemble averaging) is performed by the ensemble averaging unit shown in FIG. 6, if a host broadcasting signal randomly varies each frame, the TxID signal detection performance may be improved. If the host broadcasting signal is fixed for all of the frames, frame averaging may offer no gain.

In terms of the frequency domain, the preamble of an ATSC 3.0 host broadcasting signal is configured such that some subcarriers thereof, in which pilots are inserted, are not changed even when a frame changes, but the remaining subcarriers are changed each frame depending on the data inserted therein. A TxID signal is injected into the preamble in the time domain after the ATSC 3.0 host broadcasting signal passes the OFDM modulator block. Accordingly, a TxID signal transmission system in which the randomness of the host broadcasting signal and injection of the TxID signal are taken into account may be represented as shown in FIG. 7.

Figure 7:
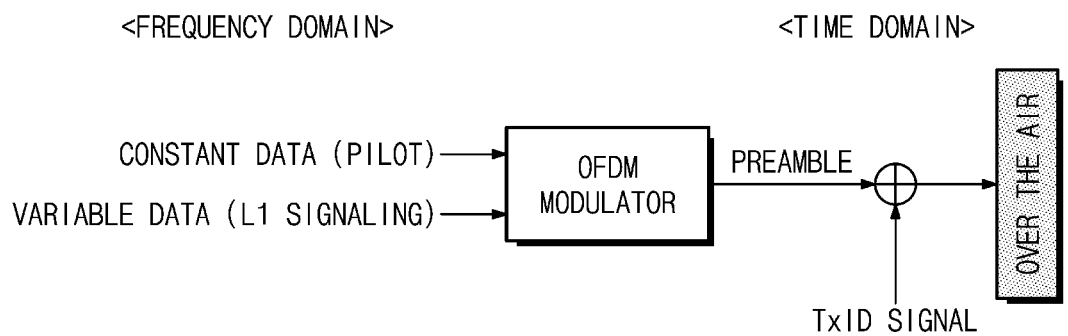
FIG. 7 is a block diagram that shows an example of a TxID transmission system in which the characteristics of a preamble signal are reflected.

FIG. 7 is a block diagram that shows an example of a TxID transmission system in which the characteristics of a preamble signal are reflected.

Referring to FIG. 7, the preamble of an ATSC 3.0 host broadcasting signal, into which a TxID signal is injected, is generated in such a way that two parts, that is, pilots, which remain constant (constant data), and data, which randomly varies (variable data), are input to the OFDM modulator.

When multiple frames are averaged in the receiver, the randomness of a host broadcasting signal may affect TxID detection performance as follows.

Hereinafter, a Signal-to-DTV noise ratio (SDR) is used as the index indicative of TxID detection performance.

Figure 8:
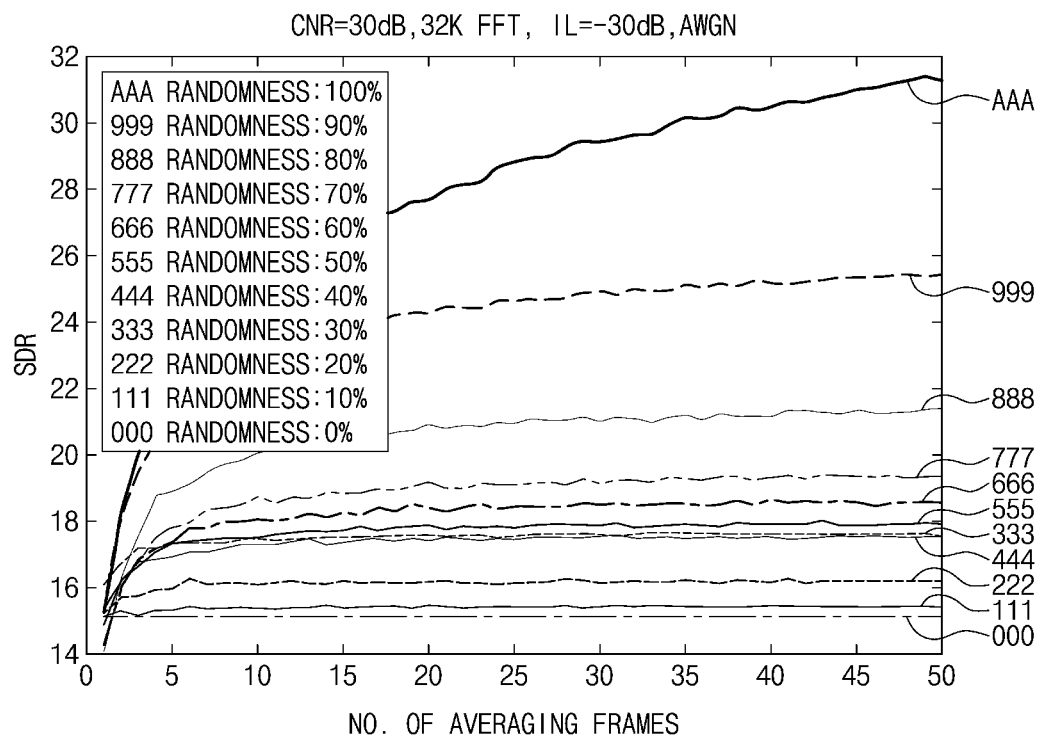
FIG. 8 is a graph that shows TxID detection performance depending on the randomness of a host broadcasting signal.

FIG. 8 is a graph that shows TxID detection performance depending on the randomness of a host broadcasting signal.

FIG. 8 shows that the randomness of a host broadcasting signal affects TxID detection performance Here, the randomness of a host broadcasting signal is defined as 'variable data/(variable data+constant data)', and a test is performed for randomness from 0% to 100% at intervals of 10% in order to check TxID detection performance depending on the randomness.

As shown in FIG. 8, when only a single frame is used, the randomness of a host broadcasting signal does not affect TxID detection performance. However, as the number of averaged frames is increased, the randomness of the host broadcasting signal increasingly affects the performance. In the example shown in FIG. 8, when the randomness is equal to or less than 80%, the performance is saturated from the point at which the number of averaged frames is about 30. This may show that, under the corresponding conditions, the apparatus for analyzing a TxID signal may provide sufficient performance by performing frame averaging only 30 times.

The randomness of a preamble signal, corresponding to the host broadcasting signal, is determined based on the FFT size and the Guard Interval (GI) of the preamble. The following Table 3 shows the randomness of a preamble signal depending on a combination of the FFT size and the guard interval.

TABLE 3

| GI Pattern | 8K FFT | 16K FFT | 32K FFT |
|---|---|---|---|
| GI1_192 | 74.16% | 76.65% | 76.65% |
| GI2_384 | 69.18% | 74.16% | 76.65% |
| GI3_512 | 65.86% | 72.50% | 75.82% |
| GI4_768 | 59.22% | 69.18% | 74.16% |
| GI5_1024 | 52.58% | 52.58% | 65.86% |
| GI6_1536 | 59.22% | 59.22% | 69.18% |
| GI7_2048 | 52.58% | 52.58% | 65.86% |
| GI8_2432 | N/A | 52.58% | 65.86% |
| GI9_3072 | N/A | 59.22% | 52.58% |
| GI10_3648 | N/A | 59.22% | 52.58% |
| GI11_4096 | N/A | 52.58% | 52.58% |
| GI12_4864 | N/A | N/A | 52.58% |

In Table 3, 'GI' denotes a guard interval, and the number following '_' denotes the length of the guard interval. For example, 'GI12_4864' denotes the twelfth guard interval, having a length of 4864.

When a single-frequency network (SFN) is configured, a guard interval is set in consideration of the distance between transmitters. In the case of T-DMB constructed in Korea, the distance between transmitters is set to about 73.75 km, and the SFN is designed based thereon. In consideration of T-DMB in Korea, it is necessary to set the value of a guard interval so as to be equal to or greater than GI6 or GI7 in Table 3 when an SFN using ATSC 3.0 is configured. If a broadcasting company considers only values greater than GI6, the randomness of a preamble becomes less than 70%, in which case the gain rapidly decreases from the point at which the number of averaged frames is 10 and the same performance is maintained from the point at which the number of averaged frames is 20, as shown in FIG. 8.

As described above, based on the FFT size and the guard interval of a preamble signal that configures an SFN, the minimum number of averaged frames for achieving optimal detection performance in the TxID detection device may be acquired.

The apparatus for analyzing a transmitter identification signal may further improve TxID signal detection performance by cancelling at least a portion of a host broadcasting signal from a received signal.

Figure 9:
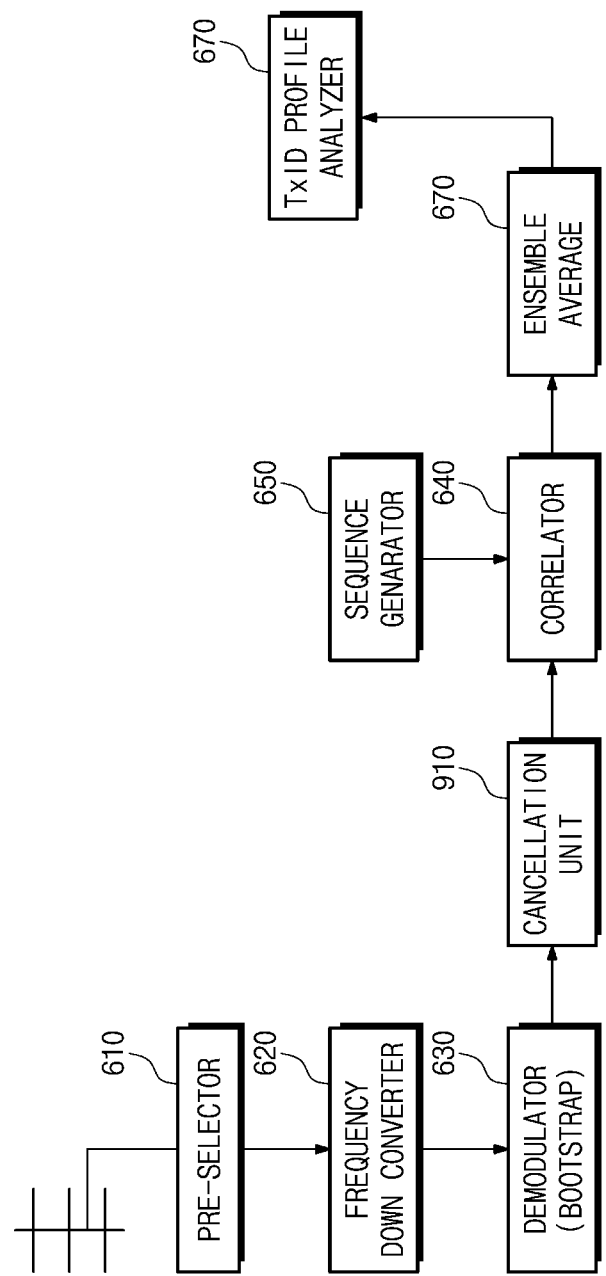
FIG. 9 is a block diagram that shows another example of the apparatus for analyzing a transmitter identification signal according to an embodiment of the present invention.

FIG. 9 is a block diagram that shows another example of the apparatus for analyzing a transmitter identification signal according to an embodiment of the present invention.

Referring to FIG. 9, the apparatus for analyzing a transmitter identification signal according to an embodiment of the present invention includes a pre-selector 610, a frequency downconverter 620, a demodulator 630, a cancellation unit 910, a correlator 640, a sequence generator 650, an ensemble averaging unit 660, and a TxID profile analyzer 670.

The pre-selector 610, the frequency downconverter 620, the demodulator 630, the correlator 640, the sequence generator 650, the ensemble averaging unit 660, and the TxID profile analyzer 670 shown in FIG. 9 may be the same as or similar to the components described with reference to FIG. 6.

The pre-selector 610 saves only the signal of a selected channel but cancels the signals of neighboring channels when an ATSC 3.0 RF broadcasting signal, including TxID signals transmitted from multiple transmitters, is received by a reception antenna.

The frequency downconverter 620 performs frequency down-conversion on the input Radio Frequency (RF) signal, thereby generating an Intermediate Frequency (IF) signal.

The demodulator 630 receives the IF signal, converts the same into a baseband signal, and decodes a bootstrap signal. Here, the demodulator 630 may decode the first preamble symbol. Using the bootstrap signal, the receiver may detect the ATSC 3.0 broadcasting signal even in a poor channel environment and may synchronize the same with the ATSC 3.0 frame.

In order to decode the first preamble symbol and then encode the same again, preamble_structure information, which is required for decoding L1-Basic, and L1-Basic parameters for L1-Detail, which are required for decoding L1-Detail, may be necessary. In particular, in order to acquire the preamble_structure information, it is necessary to decode the third symbol of the bootstrap. The following Table 4 shows a preamble_structure field and the structure of a preamble corresponding thereto.

TABLE 4

| preamble_structure | FFT Size | GI Length (samples) | Preamble Pilot DX | L1-Basic FEC Mode |
|---|---|---|---|---|
| 0 | 8192 | 192 | 16 | L1-Basic Mode 1 |
| 1 | 8192 | 192 | 16 | L1-Basic Mode 2 |
| 2 | 8192 | 192 | 16 | L1-Basic Mode 3 |
| 3 | 8192 | 192 | 16 | L1-Basic Mode 4 |
| 4 | 8192 | 192 | 16 | L1-Basic Mode 5 |
| 5 | 8192 | 384 | 8 | L1-Basic Mode 1 |
| 6 | 8192 | 384 | 8 | L1-Basic Mode 2 |
| 7 | 8192 | 384 | 8 | L1-Basic Mode 3 |
| 8 | 8192 | 384 | 8 | L1-Basic Mode 4 |
| 9 | 8192 | 384 | 8 | L1-Basic Mode 5 |
| 10 | 8192 | 512 | 6 | L1-Basic Mode 1 |
| 11 | 8192 | 512 | 6 | L1-Basic Mode 2 |
| 12 | 8192 | 512 | 6 | L1-Basic Mode 3 |
| 13 | 8192 | 512 | 6 | L1-Basic Mode 4 |
| 14 | 8192 | 512 | 6 | L1-Basic Mode 5 |
| 15 | 8192 | 768 | 4 | L1-Basic Mode 1 |
| 16 | 8192 | 768 | 4 | L1-Basic Mode 2 |
| 17 | 8192 | 768 | 4 | L1-Basic Mode 3 |
| 18 | 8192 | 768 | 4 | L1-Basic Mode 4 |
| 19 | 8192 | 768 | 4 | L1-Basic Mode 5 |
| 20 | 8192 | 1024 | 3 | L1-Basic Mode 1 |
| 21 | 8192 | 1024 | 3 | L1-Basic Mode 2 |
| 22 | 8192 | 1024 | 3 | L1-Basic Mode 3 |
| 23 | 8192 | 1024 | 3 | L1-Basic Mode 4 |
| 24 | 8192 | 1024 | 3 | L1-Basic Mode 5 |
| 25 | 8192 | 1536 | 4 | L1-Basic Mode 1 |
| 26 | 8192 | 1536 | 4 | L1-Basic Mode 2 |
| 27 | 8192 | 1536 | 4 | L1-Basic Mode 3 |
| 28 | 8192 | 1536 | 4 | L1-Basic Mode 4 |

TABLE 4-continued

| preamble_structure | FFT Size | GI Length (samples) | Preamble Pilot DX | L1-Basic FEC Mode |
|---|---|---|---|---|
| 29 | 8192 | 1536 | 4 | L1-Basic Mode 5 |
| 30 | 8192 | 2048 | 3 | L1-Basic Mode 1 |
| 31 | 8192 | 2048 | 3 | L1-Basic Mode 2 |
| 32 | 8192 | 2048 | 3 | L1-Basic Mode 3 |
| 33 | 8192 | 2048 | 3 | L1-Basic Mode 4 |
| 34 | 8192 | 2048 | 3 | L1-Basic Mode 5 |
| 35 | 16384 | 192 | 32 | L1-Basic Mode 1 |
| 36 | 16384 | 192 | 32 | L1-Basic Mode 2 |
| 37 | 16384 | 192 | 32 | L1-Basic Mode 3 |
| 38 | 16384 | 192 | 32 | L1-Basic Mode 4 |
| 39 | 16384 | 192 | 32 | L1-Basic Mode 5 |
| 40 | 16384 | 384 | 16 | L1-Basic Mode 1 |
| 41 | 16384 | 384 | 16 | L1-Basic Mode 2 |
| 42 | 16384 | 384 | 16 | L1-Basic Mode 3 |
| 43 | 16384 | 384 | 16 | L1-Basic Mode 4 |
| 44 | 16384 | 384 | 16 | L1-Basic Mode 5 |
| 45 | 16384 | 512 | 12 | L1-Basic Mode 1 |
| 46 | 16384 | 512 | 12 | L1-Basic Mode 2 |
| 47 | 16384 | 512 | 12 | L1-Basic Mode 3 |
| 48 | 16384 | 512 | 12 | L1-Basic Mode 4 |
| 49 | 16384 | 512 | 12 | L1-Basic Mode 5 |
| 50 | 16384 | 768 | 8 | L1-Basic Mode 1 |
| 51 | 16384 | 768 | 8 | L1-Basic Mode 2 |
| 52 | 16384 | 768 | 8 | L1-Basic Mode 3 |
| 53 | 16384 | 768 | 8 | L1-Basic Mode 4 |
| 54 | 16384 | 768 | 8 | L1-Basic Mode 5 |
| 55 | 16384 | 1024 | 6 | L1-Basic Mode 1 |
| 56 | 16384 | 1024 | 6 | L1-Basic Mode 2 |
| 57 | 16384 | 1024 | 6 | L1-Basic Mode 3 |
| 58 | 16384 | 1024 | 6 | L1-Basic Mode 4 |
| 59 | 16384 | 1024 | 6 | L1-Basic Mode 5 |
| 60 | 16384 | 1536 | 4 | L1-Basic Mode 1 |
| 61 | 16384 | 1536 | 4 | L1-Basic Mode 2 |
| 62 | 16384 | 1536 | 4 | L1-Basic Mode 3 |
| 63 | 16384 | 1536 | 4 | L1-Basic Mode 4 |
| 64 | 16384 | 1536 | 4 | L1-Basic Mode 5 |
| 65 | 16384 | 2048 | 3 | L1-Basic Mode 1 |
| 66 | 16384 | 2048 | 3 | L1-Basic Mode 2 |
| 67 | 16384 | 2048 | 3 | L1-Basic Mode 3 |
| 68 | 16384 | 2048 | 3 | L1-Basic Mode 4 |
| 69 | 16384 | 2048 | 3 | L1-Basic Mode 5 |
| 70 | 16384 | 2432 | 3 | L1-Basic Mode 1 |
| 71 | 16384 | 2432 | 3 | L1-Basic Mode 2 |
| 72 | 16384 | 2432 | 3 | L1-Basic Mode 3 |
| 73 | 16384 | 2432 | 3 | L1-Basic Mode 4 |
| 74 | 16384 | 2432 | 3 | L1-Basic Mode 5 |
| 75 | 16384 | 3072 | 4 | L1-Basic Mode 1 |
| 76 | 16384 | 3072 | 4 | L1-Basic Mode 2 |
| 77 | 16384 | 3072 | 4 | L1-Basic Mode 3 |
| 78 | 16384 | 3072 | 4 | L1-Basic Mode 4 |
| 79 | 16384 | 3072 | 4 | L1-Basic Mode 5 |
| 80 | 16384 | 3648 | 4 | L1-Basic Mode 1 |
| 81 | 16384 | 3648 | 4 | L1-Basic Mode 2 |
| 82 | 16384 | 3648 | 4 | L1-Basic Mode 3 |
| 83 | 16384 | 3648 | 4 | L1-Basic Mode 4 |
| 84 | 16384 | 3648 | 4 | L1-Basic Mode 5 |
| 85 | 16384 | 4096 | 3 | L1-Basic Mode 1 |
| 86 | 16384 | 4096 | 3 | L1-Basic Mode 2 |
| 87 | 16384 | 4096 | 3 | L1-Basic Mode 3 |
| 88 | 16384 | 4096 | 3 | L1-Basic Mode 4 |
| 89 | 16384 | 4096 | 3 | L1-Basic Mode 5 |
| 90 | 32768 | 192 | 32 | L1-Basic Mode 1 |
| 91 | 32768 | 192 | 32 | L1-Basic Mode 2 |
| 92 | 32768 | 192 | 32 | L1-Basic Mode 3 |
| 93 | 32768 | 192 | 32 | L1-Basic Mode 4 |
| 94 | 32768 | 192 | 32 | L1-Basic Mode 5 |
| 95 | 32768 | 384 | 32 | L1-Basic Mode 1 |
| 96 | 32768 | 384 | 32 | L1-Basic Mode 2 |
| 97 | 32768 | 384 | 32 | L1-Basic Mode 3 |
| 98 | 32768 | 384 | 32 | L1-Basic Mode 4 |
| 99 | 32768 | 384 | 32 | L1-Basic Mode 5 |
| 100 | 32768 | 512 | 24 | L1-Basic Mode 1 |
| 101 | 32768 | 512 | 24 | L1-Basic Mode 2 |
| 102 | 32768 | 512 | 24 | L1-Basic Mode 3 |
| 103 | 32768 | 512 | 24 | L1-Basic Mode 4 |
| 104 | 32768 | 512 | 24 | L1-Basic Mode 5 |
| 105 | 32768 | 768 | 16 | L1-Basic Mode 1 |
| 106 | 32768 | 768 | 16 | L1-Basic Mode 2 |
| 107 | 32768 | 768 | 16 | L1-Basic Mode 3 |
| 108 | 32768 | 768 | 16 | L1-Basic Mode 4 |
| 109 | 32768 | 768 | 16 | L1-Basic Mode 5 |
| 110 | 32768 | 1024 | 12 | L1-Basic Mode 1 |
| 111 | 32768 | 1024 | 12 | L1-Basic Mode 2 |
| 112 | 32768 | 1024 | 12 | L1-Basic Mode 3 |
| 113 | 32768 | 1024 | 12 | L1-Basic Mode 4 |
| 114 | 32768 | 1024 | 12 | L1-Basic Mode 5 |
| 115 | 32768 | 1536 | 8 | L1-Basic Mode 1 |
| 116 | 32768 | 1536 | 8 | L1-Basic Mode 2 |
| 117 | 32768 | 1536 | 8 | L1-Basic Mode 3 |
| 118 | 32768 | 1536 | 8 | L1-Basic Mode 4 |
| 119 | 32768 | 1536 | 8 | L1-Basic Mode 5 |
| 120 | 32768 | 2048 | 6 | L1-Basic Mode 1 |
| 121 | 32768 | 2048 | 6 | L1-Basic Mode 2 |
| 122 | 32768 | 2048 | 6 | L1-Basic Mode 3 |
| 123 | 32768 | 2048 | 6 | L1-Basic Mode 4 |
| 124 | 32768 | 2048 | 6 | L1-Basic Mode 5 |
| 125 | 32768 | 2432 | 6 | L1-Basic Mode 1 |
| 126 | 32768 | 2432 | 6 | L1-Basic Mode 2 |
| 127 | 32768 | 2432 | 6 | L1-Basic Mode 3 |
| 128 | 32768 | 2432 | 6 | L1-Basic Mode 4 |
| 129 | 32768 | 2432 | 6 | L1-Basic Mode 5 |
| 130 | 32768 | 3072 | 8 | L1-Basic Mode 1 |
| 131 | 32768 | 3072 | 8 | L1-Basic Mode 2 |
| 132 | 32768 | 3072 | 8 | L1-Basic Mode 3 |
| 133 | 32768 | 3072 | 8 | L1-Basic Mode 4 |
| 134 | 32768 | 3072 | 8 | L1-Basic Mode 5 |
| 135 | 32768 | 3072 | 3 | L1-Basic Mode 1 |
| 136 | 32768 | 3072 | 3 | L1-Basic Mode 2 |
| 137 | 32768 | 3072 | 3 | L1-Basic Mode 3 |
| 138 | 32768 | 3072 | 3 | L1-Basic Mode 4 |
| 139 | 32768 | 3072 | 3 | L1-Basic Mode 5 |
| 140 | 32768 | 3648 | 8 | L1-Basic Mode 1 |
| 141 | 32768 | 3648 | 8 | L1-Basic Mode 2 |
| 142 | 32768 | 3648 | 8 | L1-Basic Mode 3 |
| 143 | 32768 | 3648 | 8 | L1-Basic Mode 4 |
| 144 | 32768 | 3648 | 8 | L1-Basic Mode 5 |
| 145 | 32768 | 3648 | 3 | L1-Basic Mode 1 |
| 146 | 32768 | 3648 | 3 | L1-Basic Mode 2 |
| 147 | 32768 | 3648 | 3 | L1-Basic Mode 3 |
| 148 | 32768 | 3648 | 3 | L1-Basic Mode 4 |
| 149 | 32768 | 3648 | 3 | L1-Basic Mode 5 |
| 150 | 32768 | 4096 | 3 | L1-Basic Mode 1 |
| 151 | 32768 | 4096 | 3 | L1-Basic Mode 2 |
| 152 | 32768 | 4096 | 3 | L1-Basic Mode 3 |
| 153 | 32768 | 4096 | 3 | L1-Basic Mode 4 |
| 154 | 32768 | 4096 | 3 | L1-Basic Mode 5 |
| 155 | 32768 | 4864 | 3 | L1-Basic Mode 1 |
| 156 | 32768 | 4864 | 3 | L1-Basic Mode 2 |
| 157 | 32768 | 4864 | 3 | L1-Basic Mode 3 |
| 158 | 32768 | 4864 | 3 | L1-Basic Mode 4 |
| 159 | 32768 | 4864 | 3 | L1-Basic Mode 5 |
| 160-255 | Reserved | Reserved | Reserved | Reserved |

In the above Table 4, L1-Basic Mode 1, L1-basic Mode 2, and L1-Basic Mode 3 may correspond to QPSK and 3/15 LDPC.

In particular, L1-Basic Mode 1 may correspond to 3/15, QPSK, parity repetition ON and a first puncturing size.

Also, L1-Basic Mode 2 may correspond to 3/15, QPSK, parity repetition OFF, and a second puncturing size, which is greater than the first puncturing size.

Also, L1-Basic Mode 3 may correspond to 3/15, QPSK, parity repetition OFF, and a third puncturing size, which is greater than the second puncturing size.

In the above Table 4, L1-Basic Mode 4 may correspond to 16-NUC (Non-Uniform Constellations) and 3/15 LDPC.

In the above Table 4, L1-Basic Mode 5 may correspond to 64-NUC (Non-Uniform Constellations) and 3/15 LDPC.

In the above Table 4, L1-Basic Mode 6 and L1 Basic Mode 7 may correspond to 256-NUC (Non-Uniform Constellations) and 3/15 LDPC. Hereinafter, 'modulation method/code rate' indicates a combination of a modulation method and a code rate, such as QPSK and 3/15 LDPC.

As shown in Table 4, when the FFT size corresponding to an OFDM parameter is fixed, a preamble structure corresponding to a second guard interval length, which is shorter than a first guard interval length, may be assigned prior to a preamble structure corresponding to the first guard interval length. Also, as shown in Table 4, for a combination of the same FFT size, the same GI length, and the same pilot pattern, the first mode, the second mode, the third mode, the fourth mode and the fifth mode may be assigned in order of robustness.

The assigned sequence in the lookup table shown in Table 4 may greatly affect system performance That is, because errors may occur in some bits of signaling information received by the receiver, signaling information reconstruction performance may vary depending on the assigned sequence.

As shown in Table 4, the FFT size, the GI length, the preamble pilot DX, and the L1-Basic FEC mode are determined depending on the value of preamble_structure. Here, preamble_structure may be used by the receiver in order to acquire pilot information, which is necessary when a channel for the first preamble symbol is estimated.

The cancellation unit 910 performs a host signal cancellation process for the signal output from the demodulator 630, thereby generating a host-signal-cancelled received signal.

Here, the host signal cancellation process may be the process of cancelling a cancellation signal, corresponding to the preamble pilots included in the host broadcasting signal, from the received signal.

Here, the preamble pilots may be generated using the preamble_structure field included in the bootstrap.

Here, the host signal cancellation process may be the process of cancelling a cancellation signal, corresponding to the entire host broadcasting signal, from the received signal.

Here, the cancellation signal may be generated using at least a portion of the preamble, which is reconstructed through preamble decoding including channel decoding, and the preamble pilots, which are regenerated using the bootstrap.

Here, the cancellation signal may be generated using a hard-decision signal, which is generated through modulation of bits that are reconstructed through hard-decision decoding, and the preamble pilots, which are regenerated using the bootstrap.

Here, the modulation may be Quadrature Phase-Shift Keying (QPSK).

The sequence generator 650 generates a TxID sequence corresponding to the target to be analyzed in the TxID signal.

The correlator 640 calculates a correlation value between the signal received by the receiver and the signal corresponding to the TxID sequence generated by the sequence generator 650. That is, the correlator 640 calculates the correlation value between a signal corresponding to the host-signal-cancelled received signal and the signal corresponding to the target TxID sequence.

The ensemble averaging unit 660 performs frame averaging (or ensemble averaging) on the correlation values for multiple frames, thereby improving TxID detection performance That is, the ensemble averaging unit 660 averages frame signals corresponding to the host-signal-cancelled received signal.

The TxID profile analyzer 670 generates information about a channel between a desired transmitter (corresponding to the TxID signal) and the receiver using the correlation value.

The TxID signal may be generated by performing BPSK modulation on the TxID sequence.

Figure 10:
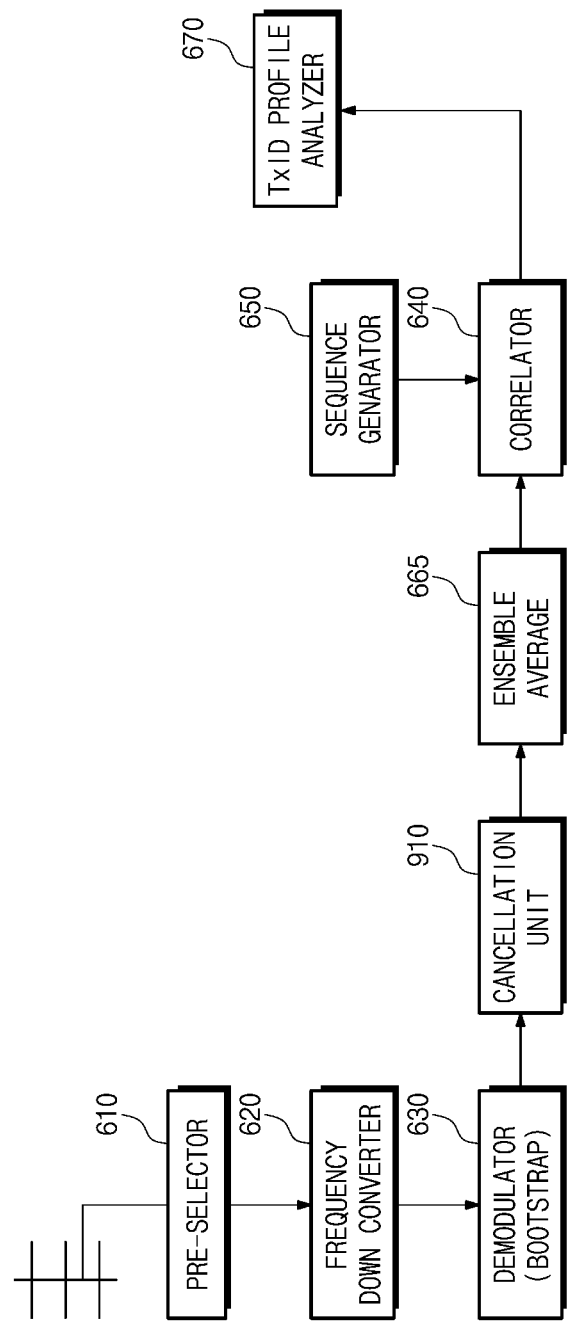
FIG. 10 is a block diagram that shows a further example of the apparatus for analyzing a transmitter identification signal according to an embodiment of the present invention.

FIG. 10 is a block diagram that shows a further example of the apparatus for analyzing a transmitter identification signal according to an embodiment of the present invention.

Referring to FIG. 10, the ensemble averaging unit 665 may operate using the output of the correlator as shown in FIG. 9, but may alternatively operate using the output of the cancellation unit 910. Here, the ensemble averaging unit 665 may perform averaging using the host-signal-cancelled received signal by receiving the output of the cancellation unit 910.

In the example shown in FIG. 10, the correlator 640 may calculate a correlation value between the output of the ensemble averaging unit 665 and a signal corresponding to a target TxID sequence.

The components shown in FIG. 10 may be the same as or similar to the components described with reference to FIG. 6 and FIG. 9.

Figure 11:
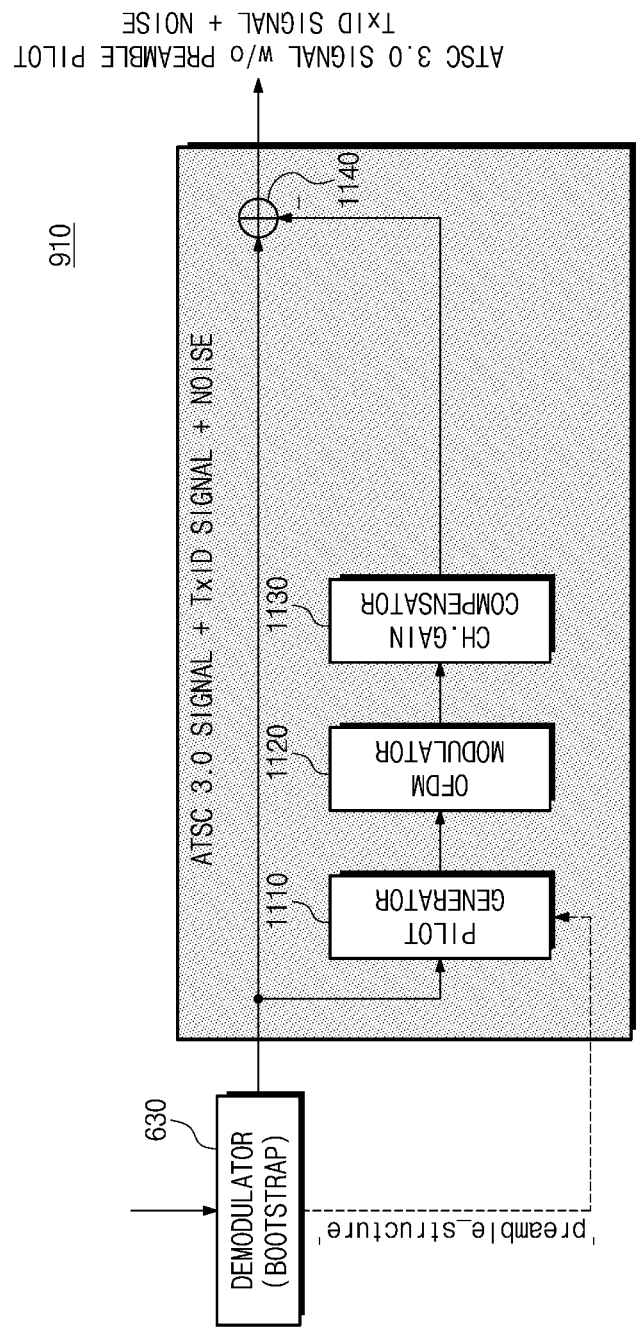
FIG. 11 is a block diagram that shows an example of the cancellation unit illustrated in FIG. 9 and FIG. 10.

FIG. 11 is a block diagram that shows an example of the cancellation unit illustrated in FIG. 9 and FIG. 10.

Referring to FIG. 11, the cancellation unit 910 includes a pilot generator 1110, an OFDM modulator 1120, a channel compensator 1130, and a subtractor 1140.

In the example shown in FIG. 11, the host signal cancellation process performed by the cancellation unit may be the process of cancelling a cancellation signal, corresponding to the preamble pilots included in a host broadcasting signal, from the received signal.

That is, in order to cancel a cancellation signal corresponding to the entire host broadcasting signal from the received signal by performing the host signal cancellation process, it is necessary to decode the first preamble. To this end, complex function blocks, such as function blocks for channel decoding, bit deinterleaving, and de-mapping, may be required.

In particular, channel decoding, such as LDPC decoding, increases the complexity of a receiver and requires a large amount of memory. Accordingly, in the example shown in FIG. 11, rather than performing preamble symbol decoding such as LDPC decoding, only pilot signals are cancelled from the received signal, whereby TxID detection performance may be improved. That is, the cancellation unit shown in FIG. 11 cancels fixed components, such as pilot signals, from the first preamble symbol, thereby improving TxID detection performance.

The pilot generator 1110 generates at least one of preamble pilots and common CP signals using preamble_structure provided from the demodulator 630. Here, the pilot generator 1110 may use only the FFT size and the guard interval length included in the preamble_structure information.

The OFDM modulator 1120 performs OFDM modulation for the input signal, similar to the process performed by an ATSC 3.0 broadcast transmitter. Here, frequency-domain pilot signals may be converted into time-domain signals by the OFDM modulator 1120. Here, the OFDM modulator 1120 may generate an OFDM signal corresponding to the preamble pilots by performing guard interval insertion, IFFT, and the like.

The channel compensator 1130 performs channel estimation and channel compensation. That is, the channel compensator 1130 reflects channel profile information in the OFDM signal, thereby generating a signal in which the channel profile information is reflected.

Here, the channel compensator 1130 performs channel estimation based on the pilots of the ATSC 3.0 frame after the completion of synchronization with the ATSC 3.0 frame using the bootstrap signal. Here, channel estimation may be performed on a combination of multiple ATSC 3.0 signals, which are received by the apparatus for analyzing a TxID signal. That is, because all of the transmitters transmit the same signal using the same pilot pattern, pilot-based channel estimation is insufficient to estimate a channel for each of the transmitters. Through channel estimation using the pilot signals of the first preamble symbol, a channel response in the frequency domain may be acquired, and the channel response may be converted into a channel response in the time domain.

The channel profile information acquired through channel estimation may be used for channel compensation for the pilot signals. Here, channel compensation may be performed through convolution of the modulated pilot signals and the estimated channel response.

The subtractor 1140 subtracts the channel-compensated signals from the received baseband signals, thereby enabling the components corresponding to the pilot signals of the first preamble symbol to be cancelled from the received signals.

Consequently, the output of the cancellation unit illustrated in FIG. 11 includes the ATSC 3.0 signal in which the pilot signals of the first preamble symbol are not included, the TxID signal, and noise.

Figure 12:
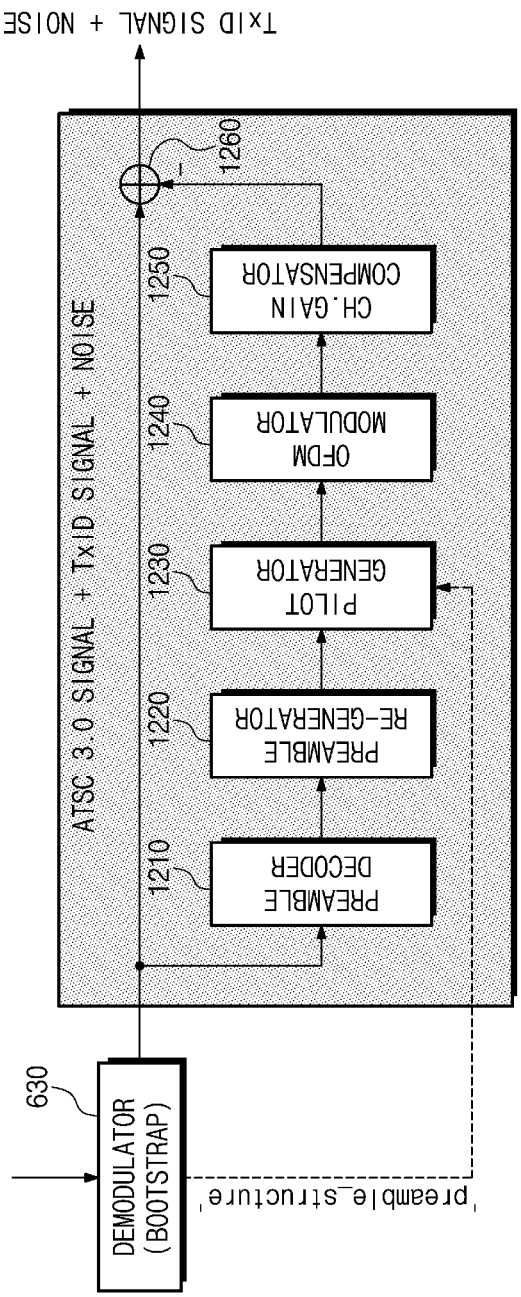
FIG. 12 is a block diagram that shows another example of the cancellation unit illustrated in FIG. 9 and FIG. 10.

FIG. 12 is a block diagram that shows another example of the cancellation unit illustrated in FIG. 9 and FIG. 10.

Referring to FIG. 12, the cancellation unit 910 includes a preamble decoder 1210, a preamble regenerator 1220, a pilot generator 1230, an OFDM modulator 1240, a channel compensator 1250, and a subtractor 1260.

In the example shown in FIG. 12, the host signal cancellation process performed by the cancellation unit may be the process of cancelling a cancellation signal corresponding to the entire host broadcasting signal from the received signal.

That is, in the example shown in FIG. 12, the entire host broadcasting signal, including data and pilots, may be cancelled from the received signal through the host signal cancellation process.

The preamble decoder 1210 performs preamble decoding in order to reconstruct the preamble signal. Here, preamble decoding may be decoding of a signal that is generated according to the ATSC 3.0 A/322 standard. To this end, the preamble decoder 1210 may include function blocks, such as an LDPC decoder and the like. Here, the preamble decoder 1210 may perform preamble decoding by receiving preamble_structure from the demodulator 630.

The preamble regenerator 1220 re-encodes the decoded preamble. Here, the preamble regenerator 1220 may re-encode only a part corresponding to the first preamble symbol, but may alternatively re-encode all of L1-Basic and L1-Detail.

The pilot generator 1230 acquires information about the pilot pattern of the preamble using preamble_structure, thereby generating pilots.

The OFDM modulator 1240 performs OFDM modulation on the part corresponding to the first preamble symbol. Here, the OFDM modulator 1240 may perform IFFT and guard interval insertion.

The channel compensator 1250 provides the first preamble symbol, which is regenerated using channel information pertaining to the estimated host preamble signal.

When the processed first preamble symbol is subtracted from the received signal through the subtractor 1260, the host broadcasting signal corresponding to the first preamble symbol is cancelled, whereby only the TxID signal and noise are output. Here, due to the incorrectness of channel estimation, a portion of the host broadcasting signal may remain in the output.

The pilot generator 1230, the OFDM modulator 1240, the channel compensator 1250, and the subtractor 1260 shown in FIG. 12 may be the same as the pilot generator 1110, the OFDM modulator 1120, the channel compensator 1130, and the subtractor 1140 shown in FIG. 11, respectively.

Figure 13:
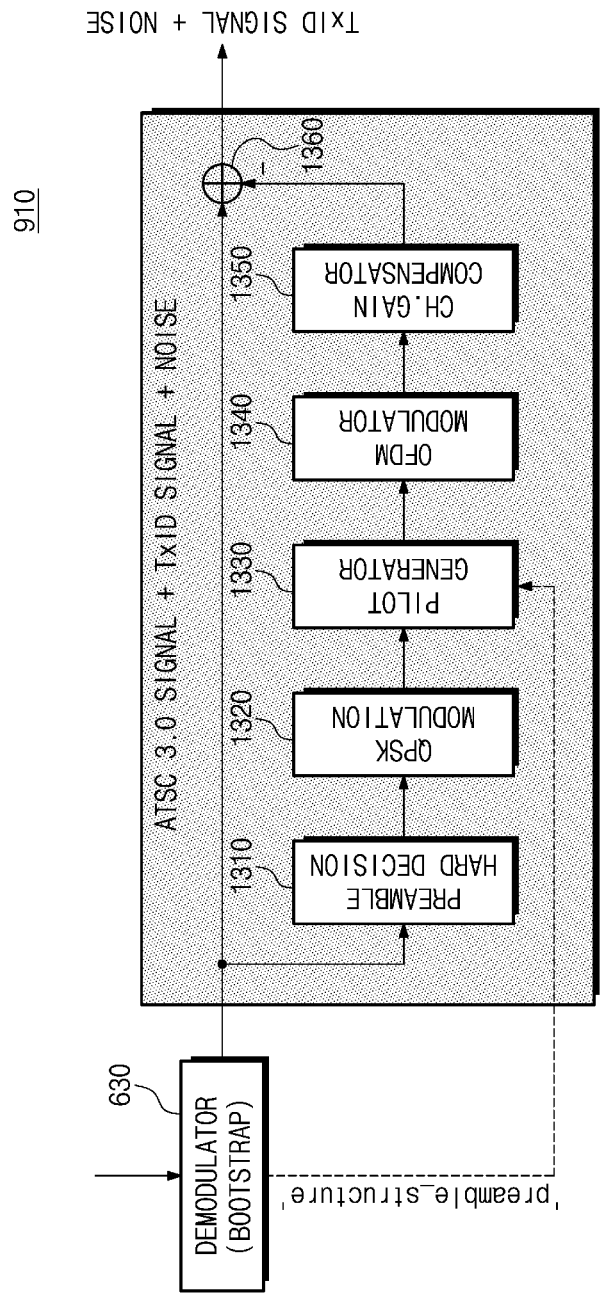
FIG. 13 is a block diagram that shows a further example of the cancellation unit illustrated in FIG. 9 and FIG. 10.

FIG. 13 is a block diagram that shows a further example of the cancellation unit illustrated in FIG. 9 and FIG. 10.

Referring to FIG. 13, the cancellation unit 910 may include a preamble hard-decision unit 1310, a QPSK modulation unit 1320, a pilot generator 1330, an OFDM modulator 1340, a channel compensator 1350, and a subtractor 1360.

In the example shown in FIG. 13, the host signal cancellation process performed by the cancellation unit is the process of cancelling a cancellation signal, corresponding to the entire host broadcasting signal, from the received signal, but the cancellation signal may be calculated using a further simplified method, compared to the example shown in FIG. 12.

Implementation of the preamble decoder shown in FIG. 12 may significantly increase the complexity of the apparatus for analyzing a TxID signal due to components such as an LDPC decoder.

The preamble hard-decision unit 1310 reconstructs bits for the first symbol of a preamble through hard-decision decoding.

The QPSK modulation unit 1320 performs QPSK modulation on the reconstructed bits.

That is, through the preamble hard-decision unit 1310 and the QPSK modulation unit 1320, the transmitted preamble signal is reconstructed without performing LDPC decoding.

Here, the reason why the QPSK modulation unit 1320 performs Quadrature Phase-Shift Keying (QPSK) is that it is highly probable that the preamble was encoded using QPSK. However, any modulation method other than QPSK may also be used.

In particular, because L1-Basic Mode 1, L1-Basic Mode 2, and L1-Basic Mode 3 of an ATSC 3.0 broadcast system use QPSK, and because L1-Basic Mode 1 or L1-Basic Mode 2 is commonly used in order to ensure sufficient robustness, the embodiment of FIG. 13 using QPSK may achieve performance that is close to the performance achieved by the embodiment of FIG. 12 although it significantly reduces implementation complexity.

The pilot generator 1330, the OFDM modulator 1340, the channel compensator 1350, and the subtractor 1360 shown in FIG. 13 may be the same as the pilot generator 1230, the OFDM modulator 1240, the channel compensator 1250, and the subtractor 1260 shown in FIG. 12, respectively.

Figure 14:
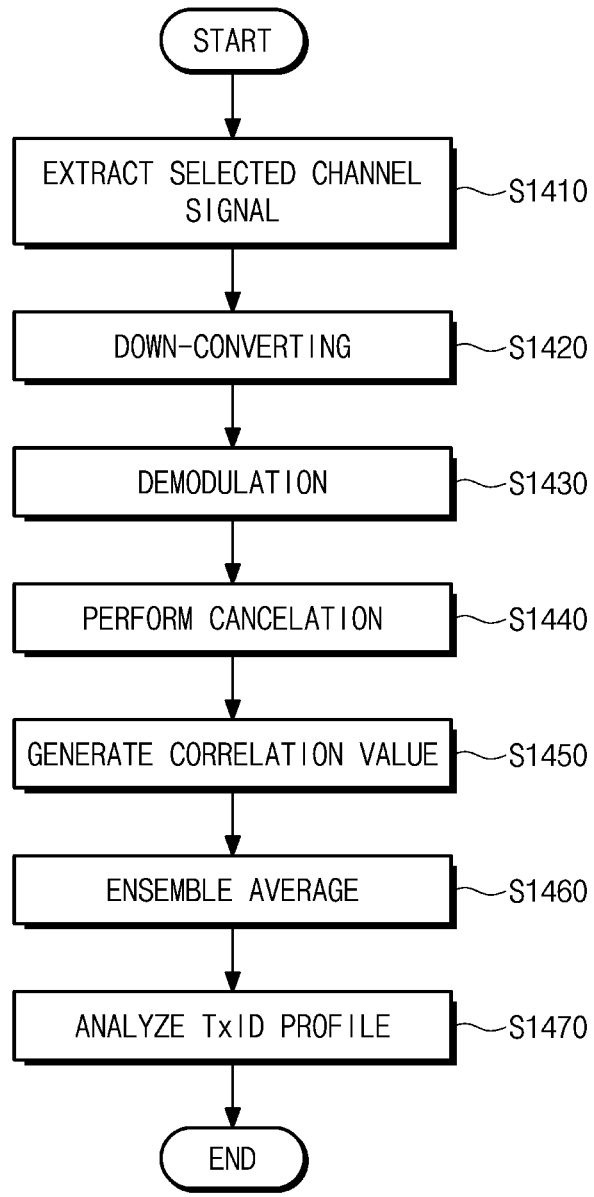
FIG. 14 is a flowchart that shows an example of a method for analyzing a transmitter identification signal according to an embodiment of the present invention.

FIG. 14 is a flowchart that shows an example of a method for analyzing a transmitter identification signal according to an embodiment of the present invention.

Referring to FIG. 14, in the method for analyzing a transmitter identification signal according to an embodiment of the present invention, when an ATSC 3.0 RF broadcasting signal, including TxID signals transmitted from multiple transmitters, is received by a reception antenna, only the signal of a selected channel is saved, but the signals of neighboring channels are cancelled therefrom at step S1410.

Also, in the method for analyzing a transmitter identification signal according to an embodiment of the present invention, frequency down-conversion is performed on the input RF signal, whereby an IF signal is generated at step S1420.

Also, in the method for analyzing a transmitter identification signal according to an embodiment of the present invention, demodulation is performed, whereby the bootstrap of the received signal is decoded at step S1430.

Also, in the method for analyzing a transmitter identification signal according to an embodiment of the present invention, a host signal cancellation process is performed for the received signal, whereby a host-signal-cancelled received signal is generated at step S1440.

Here, the host signal cancellation process is the process of cancelling a cancellation signal, corresponding to preamble pilots included in the host broadcasting signal, from the received signal.

Here, the preamble pilots may be generated using the preamble_structure field included in the bootstrap.

Here, the host signal cancellation process may be the process of cancelling a cancellation signal corresponding to the entire host broadcasting signal from the received signal.

Here, the cancellation signal may be generated using at least a portion of the preamble, which is reconstructed through preamble decoding including channel decoding, and the preamble pilots, which are regenerated using the bootstrap.

Here, the cancellation signal may be generated using a hard-decision signal, which is generated through modulation of bits that are reconstructed through hard-decision decoding, and the preamble pilots, which are regenerated using the bootstrap.

Here, the modulation may be Quadrature Phase-Shift Keying (QPSK).

Also, in the method for analyzing a transmitter identification signal according to an embodiment of the present invention, a correlation value between a signal corresponding to the host-signal-cancelled received signal and a signal corresponding to the transmitter identification (TxID) sequence is calculated at step S1450.

Here, the signal corresponding to the host-signal-cancelled received signal may be the host-signal-cancelled received signal itself.

Also, in the method for analyzing a transmitter identification signal according to an embodiment of the present invention, frame signals for the host-signal-cancelled received signal are averaged at step S1460.

Here, averaging may be performed using the correlation value.

Also, in the method for analyzing a transmitter identification signal according to an embodiment of the present invention, information about a channel between a transmitter corresponding to the transmitter identification (TxID) signal and the receiver is generated using the correlation value at step S1470.

Here, steps S1450 and S1460 shown in FIG. 14 may be performed in reverse order. That is, after frame signals for the host-signal-cancelled received signal are averaged by performing step S1460 shown in FIG. 14, the correlation value may be calculated by performing step S1450 using the result of averaging. Here, averaging is performed using the host-signal-cancelled received signal, and the signal corresponding to the host-signal-cancelled received signal at step S1450 may be the signal generated by performing averaging at step S1460.

Figure 15:
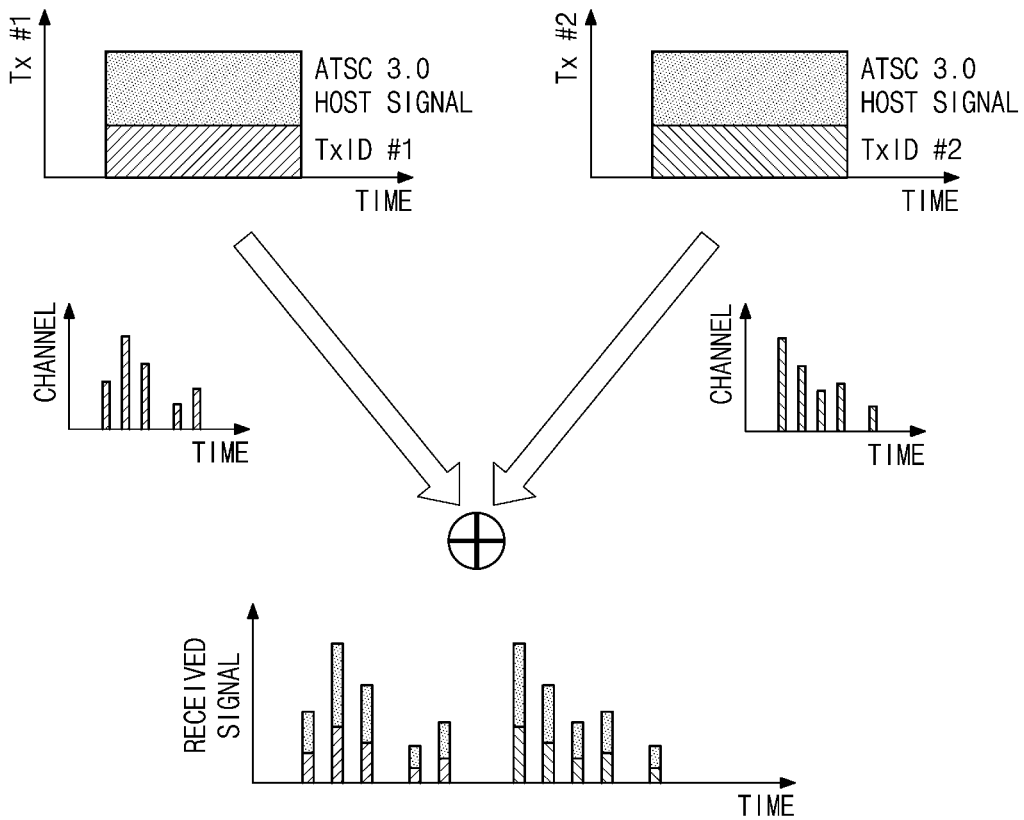
FIG. 15 is a view that shows an example of multiple ATSC 3.0 reception signals in which different TxID signals are included.

FIG. 15 is a view that shows an example of multiple ATSC 3.0 reception signals in which different TxID signals are included.

Referring to FIG. 15, in a single-frequency network (SFN) environment in which there are two transmitters, each of the transmitters injects a TxID signal into a broadcasting signal and transmits the broadcasting signal. The signal received by a receiver is a signal in which the signals from the respective transmitters are combined, and unless it analyzes the TxID, the receiver may not identify the transmitter from which the received signal is transmitted.

Figure 16:
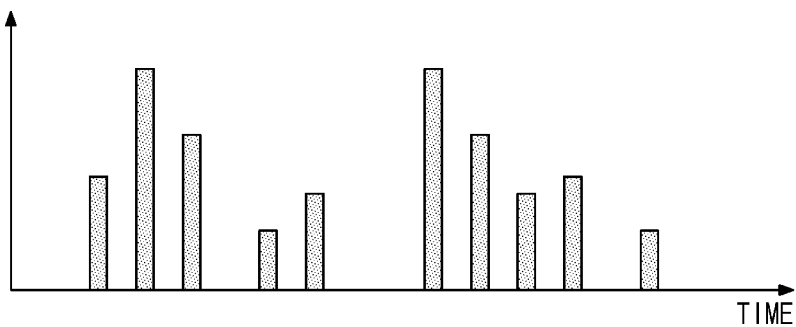
FIG. 16 is a view that shows an example of channel estimation based on ATSC 3.0 pilots.

FIG. 16 is a view that shows an example of channel estimation based on ATSC 3.0 pilots.

Referring to FIG. 16, when channel estimation is performed using a pilot signal in the receiver, channel information pertaining to all of the host broadcasting signals is estimated.

In order to generate information about a channel between each transmitter and a receiver in an SFN, channel estimation using a TxID signal is necessarily required. To this end, the host broadcasting signal is cancelled from the received signal, whereby the signal shown in FIG. 17 may be detected.

Figure 17:
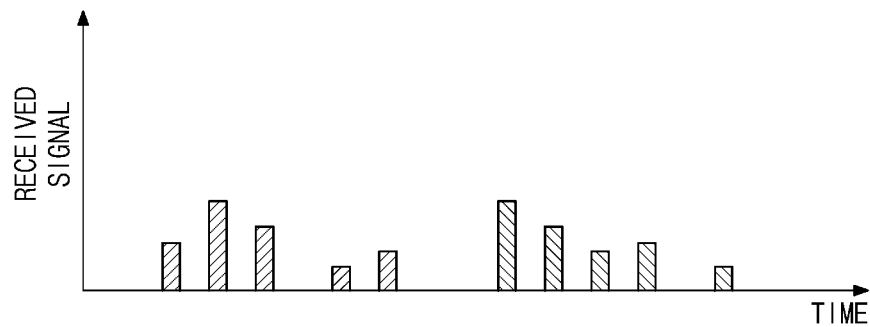
FIG. 17 is a view that shows an example of a received signal after cancellation of a host broadcasting signal is applied thereto.

FIG. 17 is a view that shows an example of the received signal after cancellation of a host broadcasting signal is applied thereto.

Figure 18:
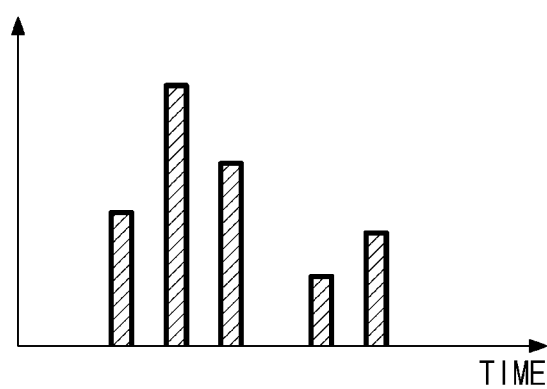
FIG. 18 is a view that shows an example of channel estimation using a target TxID signal that remains after cancellation of the preamble of a host broadcasting signal is applied.

Also, when a correlation with a desired TxID signal is calculated, channel information pertaining to a desired transmitter may be generated as shown in FIG. 18.

FIG. 18 is a view that shows an example of channel estimation using a target TxID signal that remains after cancellation of the preamble of a host broadcasting signal is applied.

Figure 19:
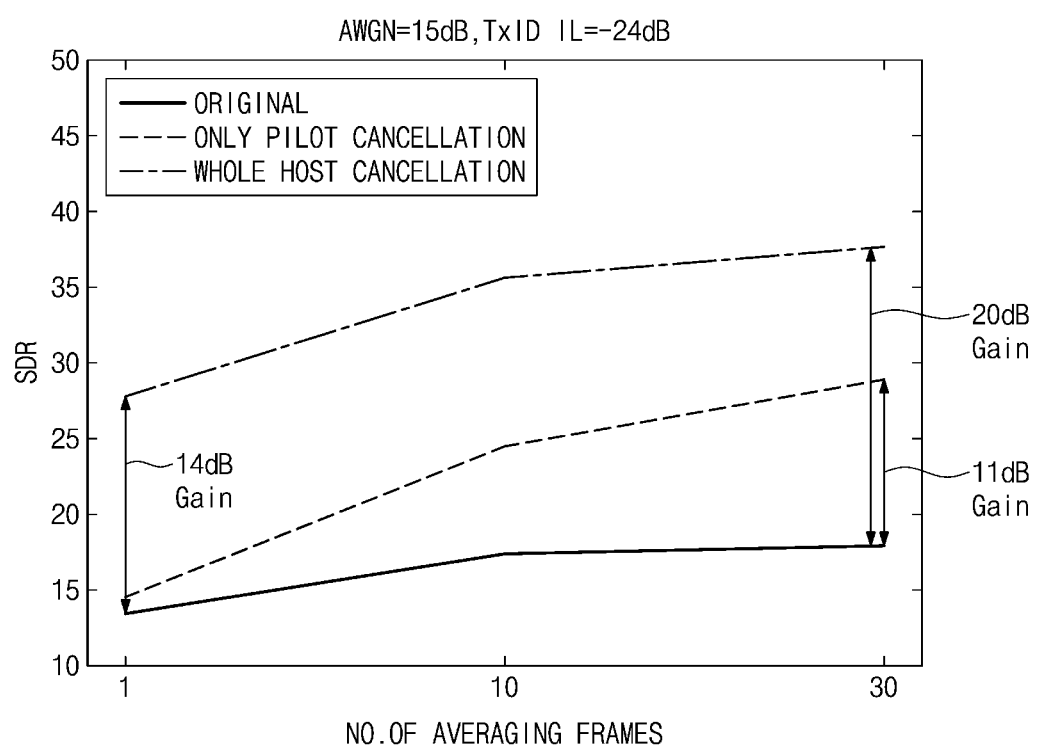
FIG. 19 is a graph that shows the TxID signal detection performance of an apparatus for analyzing a transmitter identification signal according to an embodiment of the present invention.

FIG. 19 is a graph that shows the TxID signal detection performance of an apparatus for analyzing a transmitter identification (TxID) signal according to an embodiment of the present invention.

Referring to FIG. 19, when a host signal cancellation process is not performed ('ORIGINAL' in the graph), performance gain is not large even when multiple frames are averaged.

When cancellation of the entire host broadcasting signal is performed as shown in the example of FIG. 12 ('WHOLE HOST CANCELLATION' in the graph), high performance gain is achieved even when frame averaging is not performed, and performance gain may be maximized depending on frame averaging.

When cancellation of pilots is performed as shown in the example of FIG. 11 ('ONLY PILOT CANCELLATION' in the graph) and when frame averaging is not performed, performance is similar to the performance that is achieved when a host cancellation process is not performed. However, when cancellation of pilots is performed and when frame averaging is performed, reduction of randomness attributable to the pilots is no longer caused, whereby 11 dB of performance gain may be acquired, relative to the case in which the host signal cancellation process is not performed ('ORIGINAL' in the graph).

Although not illustrated in FIG. 19, when cancellation of the entire host broadcasting signal is simply performed through hard-decision decoding, as shown in the example shown in FIG. 13, performance is similar to the performance that is achieved when cancellation of the entire host broadcasting signal is performed ('WHOLE HOST CANCELLATION' in the graph of FIG. 19), and the performance may be at least higher than the performance achieved when cancellation of the pilots is performed ('ONLY PILOT CANCELLATION' in the graph of FIG. 19).

Figure 20:
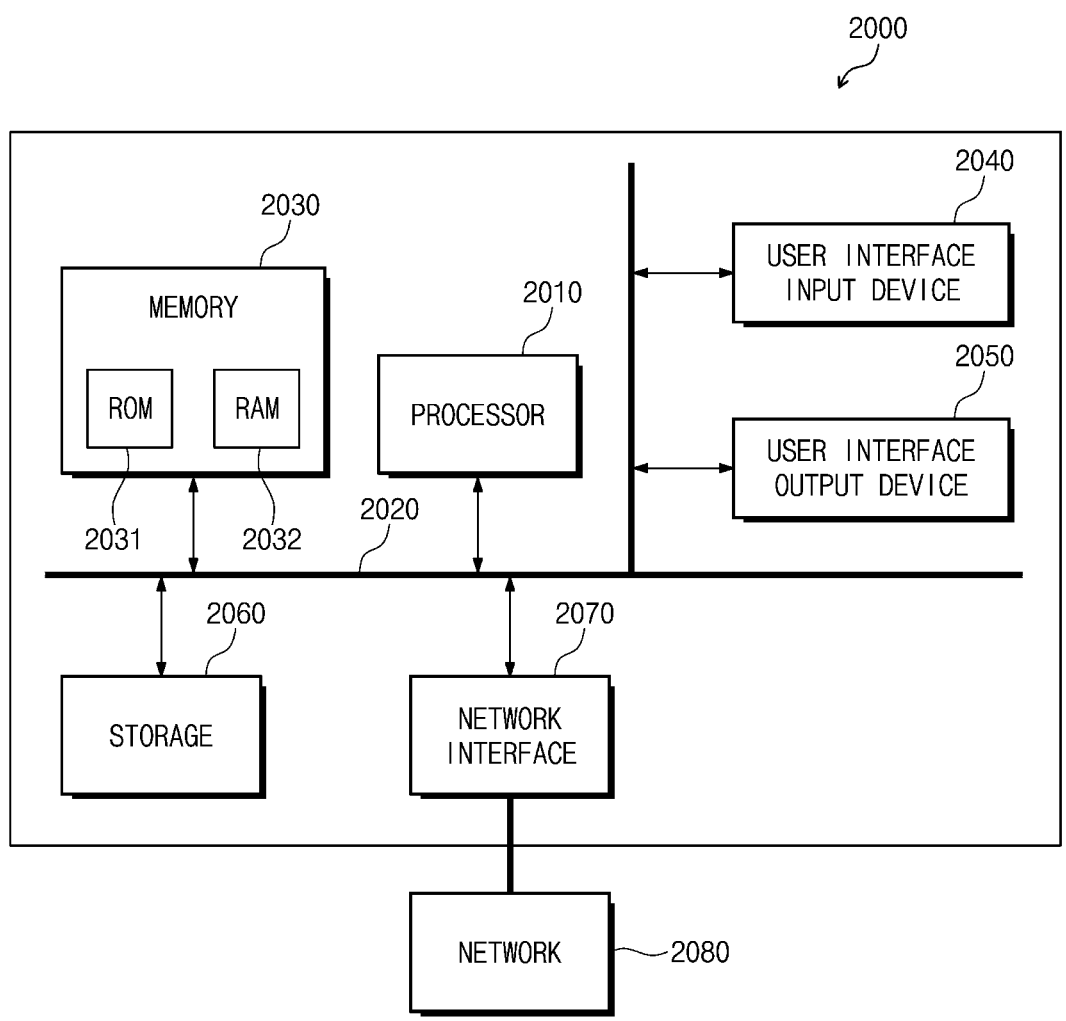
FIG. 20 is a block diagram that shows a computer system according to an embodiment of the present invention.

FIG. 20 is a view that shows a computer system according to an embodiment of the present invention.

Referring to FIG. 20, an apparatus for analyzing a transmitter identification signal according to an embodiment of the present invention may be implemented in a computer system 2000 including a computer-readable recording medium. As shown in FIG. 20, the computer system 2000 may include one or more processors 2010, memory 2030, a user-interface input device 2040, a user-interface output device 2050, and storage 960, which communicate with each other via a bus 2020. Also, the computer system 2000 may further include a network interface 2070 connected to a network 2080. The processor 2010 may be a central processing unit or a semiconductor device for executing processing instructions stored in the memory 2030 or the storage 2060. The memory 2030 and the storage 2060 may be various types of volatile or nonvolatile storage media. For example, the memory may include ROM 2031 or RAM 2032.

According to the present invention, a receiver may identify transmitters using transmitter identification (TxID) signals transmitted therefrom in a next-generation broadcast system.

Also, the present invention may provide a transmitter identification signal reception method that is suitable for next-generation standards such as ATSC 3.0 and the like.

Also, according to the present invention, a transmitter identification (TxID) signal injected into a host broadcasting signal, such as a host ATSC 3.0 signal or the like, may be efficiently detected, and the detected TxID signal may be precisely analyzed, whereby accurate network configuration information may be acquired.

Also, according to the present invention, transmitter identification signals for identifying respective transmitters in an SFN are detected, whereby transmission power and transmission time for configuring the SFN may be optimally adjusted.

As described above, the apparatus and method for analyzing a transmitter identification signal according to the present invention are not limitedly applied to the configurations and operations of the above-described embodiments, but all or some of the embodiments may be selectively combined and configured, so that the embodiments may be modified in various ways.

What is claimed is:

1. An apparatus for analyzing a transmitter identification (TxID) signal, comprising a processor and a memory storing at least one instruction to be executed by the processor, wherein the at least one instruction is configured to:
   decode a bootstrap of a received signal;
   perform a host signal cancellation process for the received signal, thereby generating a host-signal-cancelled received signal;
   calculate a correlation value between a signal corresponding to the host-signal-cancelled received signal and a signal corresponding to a TxID sequence; and
   generate information about a channel between a transmitter corresponding to the TxID sequence and a receiver using the correlation value,
   wherein the TxID sequence is generated by using a tier 1 register unit and a tier 2 register unit at the transmitter,
   wherein the tier 1 register unit includes registers which are preloaded to 0 except for x stage and a register which is preloaded to 1 for x stage,
   wherein the tier 2 register unit includes registers which are preloaded corresponding to a 13-bit value assigned to the transmitter.

2. The apparatus of claim 1, wherein the at least one instruction is further configured to:
   average frame signals corresponding to the host-signal-cancelled received signal.

3. The apparatus of claim 2, wherein the host signal cancellation process is configured to cancel a cancellation signal, corresponding to a preamble pilot included in a host broadcasting signal, from the received signal.

4. The apparatus of claim 2, wherein the host signal cancellation process is configured to cancel a cancellation signal, corresponding to an entire host broadcasting signal, from the received signal.

5. The apparatus of claim 4, wherein the cancellation signal is generated using at least a portion of a preamble, which is reconstructed through preamble decoding including channel decoding, and a preamble pilot, which is regenerated using the bootstrap.

6. The apparatus of claim 4, wherein the cancellation signal is generated using a hard-decision signal, which is generated through modulation of bits reconstructed through hard-decision decoding, and a preamble pilot, which is regenerated using the bootstrap.

7. The apparatus of claim 6, wherein the modulation is Quadrature Phase-Shift Keying (QPSK).

8. The apparatus of claim 2, wherein averaging is performed using the correlation value, and the signal corresponding to the host-signal-cancelled received signal is the host-signal-cancelled received signal.

9. The apparatus of claim 2, wherein averaging is performed using the host-signal-cancelled received signal, and the signal corresponding to the host-signal-cancelled received signal is a signal generated through averaging.

10. The apparatus of claim 3, wherein the preamble pilot is generated using a preamble_structure field included in the bootstrap.

11. A method for analyzing a transmitter identification (TxID) signal, comprising:
    decoding a bootstrap of a received signal;
    performing a host signal cancellation process for the received signal, thereby generating a host-signal-cancelled received signal;
    calculating a correlation value between a signal corresponding to the host-signal-cancelled received signal and a signal corresponding to a TxID sequence; and
    generating information about a channel between a transmitter corresponding to the TxID sequence and a receiver using the correlation value,
    wherein the TxID sequence is generated by using a tier 1 register unit and a tier 2 register unit at the transmitter,
    wherein the tier 1 register unit includes registers which are preloaded to 0 except for x stage and a register which is preloaded to 1 for x stage,
    wherein the tier 2 register unit includes registers which are preloaded corresponding to a 13-bit value assigned to the transmitter.

12. The method of claim 11, further comprising:
    averaging frame signals corresponding to the host-signal-cancelled received signal.

13. The method of claim 12, wherein the host signal cancellation process is configured to cancel a cancellation signal, corresponding to a preamble pilot included in a host broadcasting signal, from the received signal.

14. The method of claim 11, wherein the host signal cancellation process is configured to cancel a cancellation signal, corresponding to an entire host broadcasting signal, from the received signal.

15. The method of claim 14, wherein the cancellation signal is generated using at least a portion of a preamble, which is reconstructed through preamble decoding including channel decoding, and a preamble pilot, which is regenerated using the bootstrap.

16. The method of claim 14, wherein the cancellation signal is generated using a hard-decision signal, which is generated through modulation of bits reconstructed through hard-decision decoding, and a preamble pilot, which is regenerated using the bootstrap.

17. The method of claim 16, wherein the modulation is Quadrature Phase-Shift Keying (QPSK).

18. The method of claim 12, wherein averaging is performed using the correlation value, and the signal corresponding to the host-signal-cancelled received signal is the host-signal-cancelled received signal.

19. The method of claim 12, wherein averaging is performed using the host-signal-cancelled received signal, and the signal corresponding to the host-signal-cancelled received signal is a signal generated through averaging.

20. The method of claim 13, wherein the preamble pilot is generated using a preamble_structure field included in the bootstrap.

\* \* \* \* \*